| (12) | United States Patent | (10) Patent No.: | US 12,330,458 B2 |
|---|---|---|---|
| | Padula | (45) Date of Patent: | Jun. 17, 2025 |

(54) TRUCKS AND TRAILERS WITH POWER CONVERSION ELEMENTS AND SUSPENSION SYSTEMS ACCOMMODATING POWER CONVERSION ELEMENTS INBOARD OF A WHEEL

(71) Applicant: Santo A. Padula, Owings Mills, MD (US)

(72) Inventor: Santo A. Padula, Owings Mills, MD (US)

( * ) Notice: Subject to any disclaimer, the term of this patent is extended or adjusted under 35 U.S.C. 154(b) by 0 days.

(21) Appl. No.: 18/114,620

(22) Filed: Feb. 27, 2023

(65) Prior Publication Data

US 2023/0271468 A1 Aug. 31, 2023

Related U.S. Application Data

(60) Provisional application No. 63/313,896, filed on Feb. 25, 2022.

(51) Int. Cl.
*B60G 11/27* (2006.01)
*B60K 7/00* (2006.01)

(52) U.S. Cl.
CPC ............ *B60G 11/27* (2013.01); *B60K 7/0007* (2013.01); *B60G 2202/152* (2013.01); *B60G 2204/148* (2013.01); *B60G 2300/02* (2013.01); *B60G 2300/04* (2013.01); *B60K 2007/003* (2013.01)

(58) Field of Classification Search
CPC .............. B60G 11/27; B60G 2202/152; B60G 2204/148; B60G 2300/02; B60G 2300/04; B60G 2200/422; B60G 2204/126; B60G 2204/13; B60K 7/0007; B60K 2007/003; B60K 2007/0061; B60K 2007/0092; B60B 35/14; B60B 35/16
See application file for complete search history.

(56) References Cited

U.S. PATENT DOCUMENTS

| 1,012,788 | A | 12/1911 | Zwingenberger |
|---|---|---|---|
| 1,167,192 | A | 1/1916 | McDonnall |
| 11,654,987 | B2 | 5/2023 | Sardes et al. |
| 11,667,328 | B2 | 6/2023 | Kenion et al. |
| 11,685,208 | B2 | 6/2023 | Sardes et al. |
| 11,701,935 | B2 | 7/2023 | Dekel et al. |
| 11,707,956 | B2 | 7/2023 | Sardes et al. |

(Continued)

FOREIGN PATENT DOCUMENTS

EP 3705321 A1 * 9/2020 ........... B60B 35/008

*Primary Examiner* — Jason D Shanske
*Assistant Examiner* — Matthew Joseph Ganci
(74) *Attorney, Agent, or Firm* — Renner, Kenner, Greive, Bobak, Taylor & Weber

(57) ABSTRACT

A truck or trailer includes a wheel, a stub axle spindle extending through the wheel and having a through bore, a step-up drive ratio unit inboard of said stub-axle spindle, an axle shaft extending through the through bore of the stub-axle spindle, and a power conversion unit operatively connected to the step-up drive ratio unit. The axle shaft is operatively connected to the step-up drive ratio unit, such that, as the axle shaft rotates with the wheel, mechanical energy from rotation of the axle shaft is converted into electrical energy. A special suspension system allows for installation of the stub axle spindle, and such suspension systems are a separate focus herein as well as being usable in combination with the power conversion elements.

15 Claims, 28 Drawing Sheets

(56) References Cited

U.S. PATENT DOCUMENTS

| | | |
|---|---|---|
| 11,780,285 B2 | 10/2023 | Jefferies et al. |
| 11,813,995 B2 | 11/2023 | Geula et al. |
| 11,827,069 B2 | 11/2023 | Sardes et al. |
| 11,840,247 B2 | 12/2023 | Barel et al. |
| 11,845,455 B2 | 12/2023 | Sutton et al. |
| 11,891,138 B2 | 2/2024 | Sardes et al. |
| 11,919,357 B2 | 3/2024 | Jefferies et al. |
| 11,927,228 B2 | 3/2024 | Avigur et al. |
| 11,938,780 B2 | 3/2024 | Sardes et al. |
| 11,964,531 B2 | 4/2024 | Aknin et al. |
| 12,077,234 B2 | 9/2024 | Aknin et al. |
| 2003/0122341 A1* | 7/2003 | Smith .................. B60G 7/006 280/124.135 |
| 2022/0032704 A1* | 2/2022 | Desourdy ................ B60G 7/02 |
| 2023/0031727 A1 | 2/2023 | Kenion et al. |
| 2023/0032858 A1 | 2/2023 | Sardes et al. |
| 2023/0037230 A1 | 2/2023 | Sardes et al. |
| 2023/0037444 A1 | 2/2023 | Sardes et al. |
| 2023/0073135 A1 | 3/2023 | Sardes et al. |
| 2023/0075975 A1 | 3/2023 | Dekel et al. |
| 2023/0116569 A1 | 4/2023 | Sutton et al. |
| 2023/0150323 A1 | 5/2023 | Dekel et al. |
| 2023/0256787 A1 | 8/2023 | Jefferies et al. |
| 2023/0256789 A1 | 8/2023 | Jefferies et al. |
| 2023/0294621 A1 | 9/2023 | Geula et al. |
| 2023/0311570 A1 | 10/2023 | Aknin |
| 2023/0311986 A1 | 10/2023 | Avigur et al. |
| 2023/0313854 A1 | 10/2023 | Avigur et al. |
| 2023/0382220 A1 | 11/2023 | Starik et al. |
| 2023/0400021 A1 | 12/2023 | Lippmann et al. |
| 2024/0042818 A1 | 2/2024 | Sardes et al. |
| 2024/0131893 A1 | 4/2024 | Dekel et al. |
| 2024/0176923 A1 | 5/2024 | Barel et al. |
| 2024/0200594 A1 | 6/2024 | Shkedy et al. |
| 2024/0262438 A1 | 8/2024 | Sardes et al. |
| 2024/0308447 A1 | 9/2024 | Sutton et al. |
| 2024/0317308 A1 | 9/2024 | Kenion et al. |

\* cited by examiner

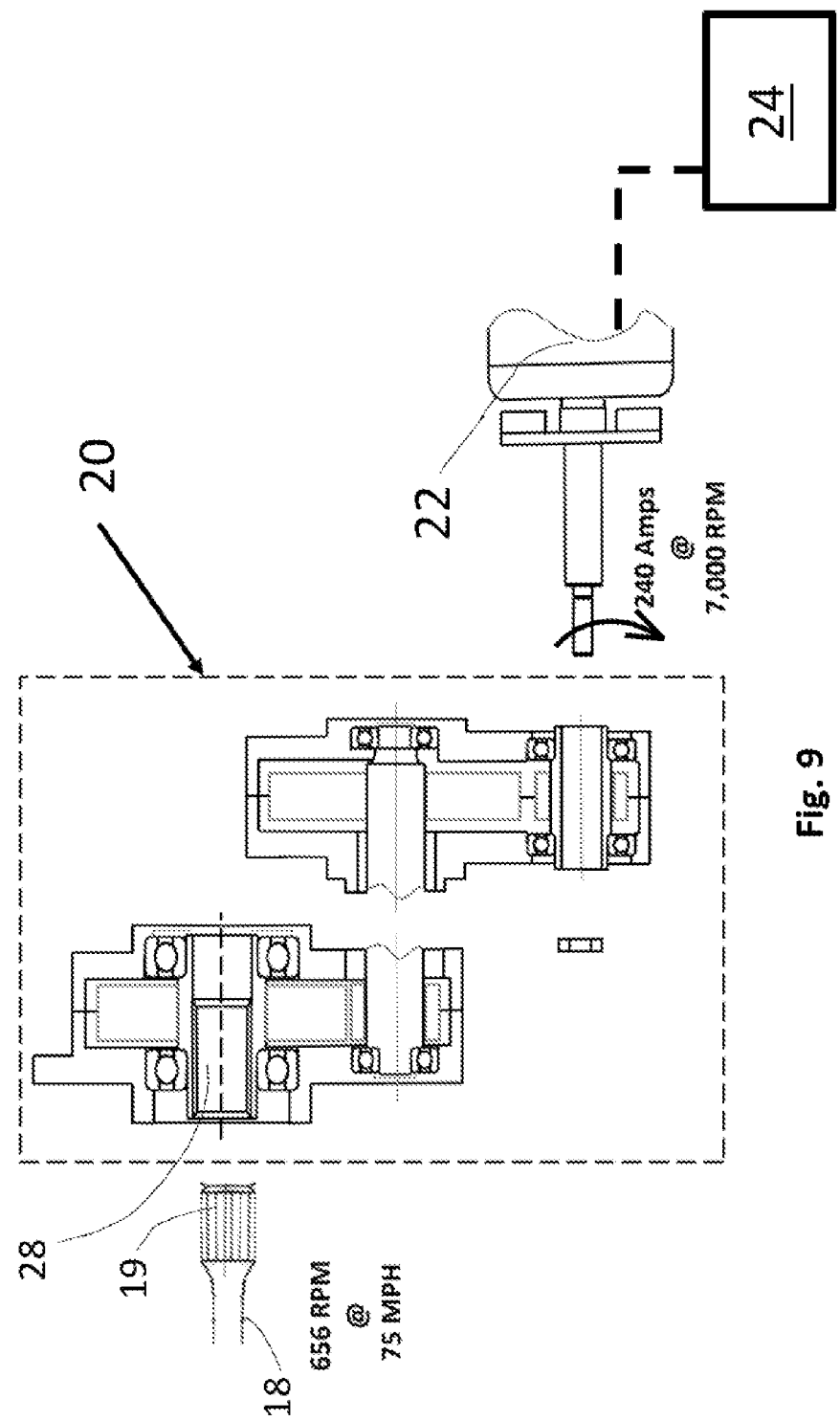

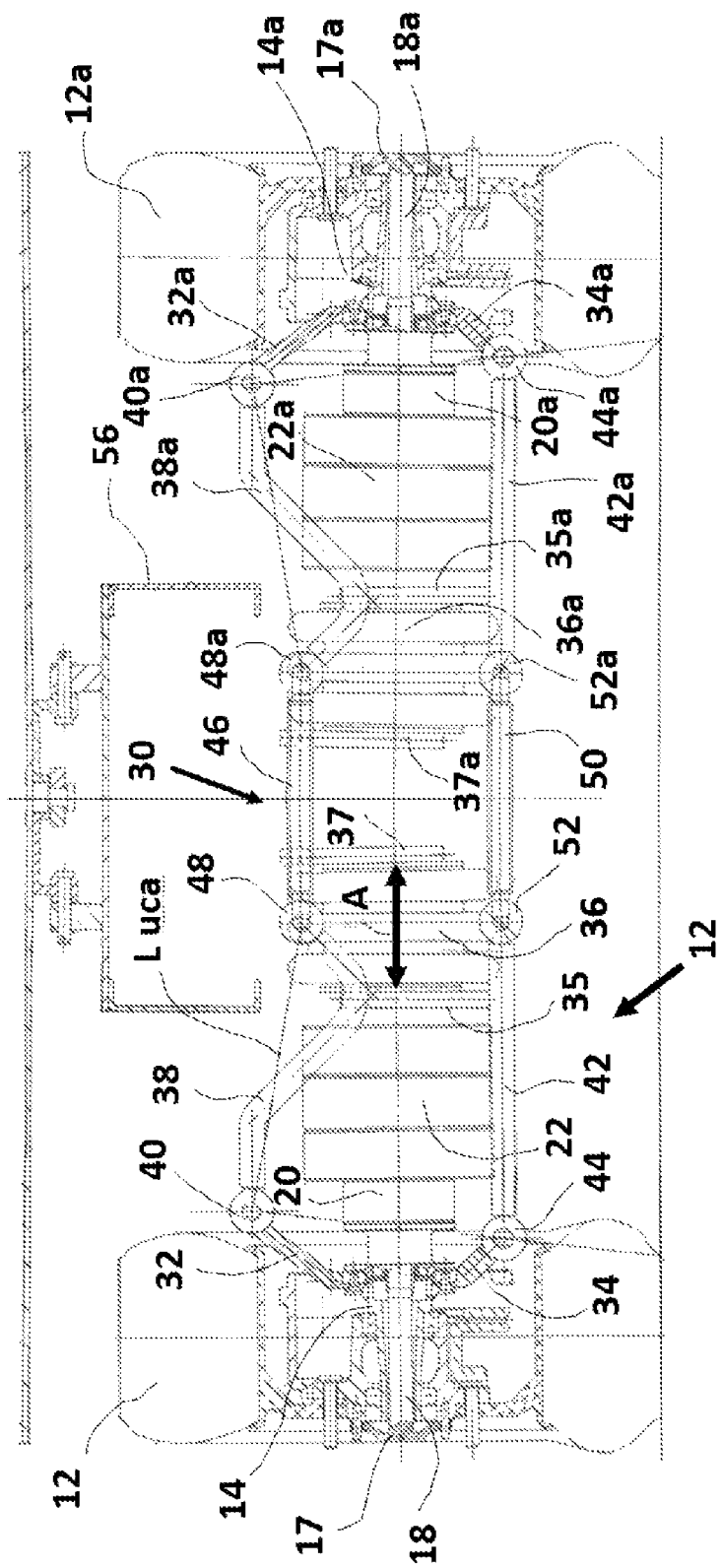

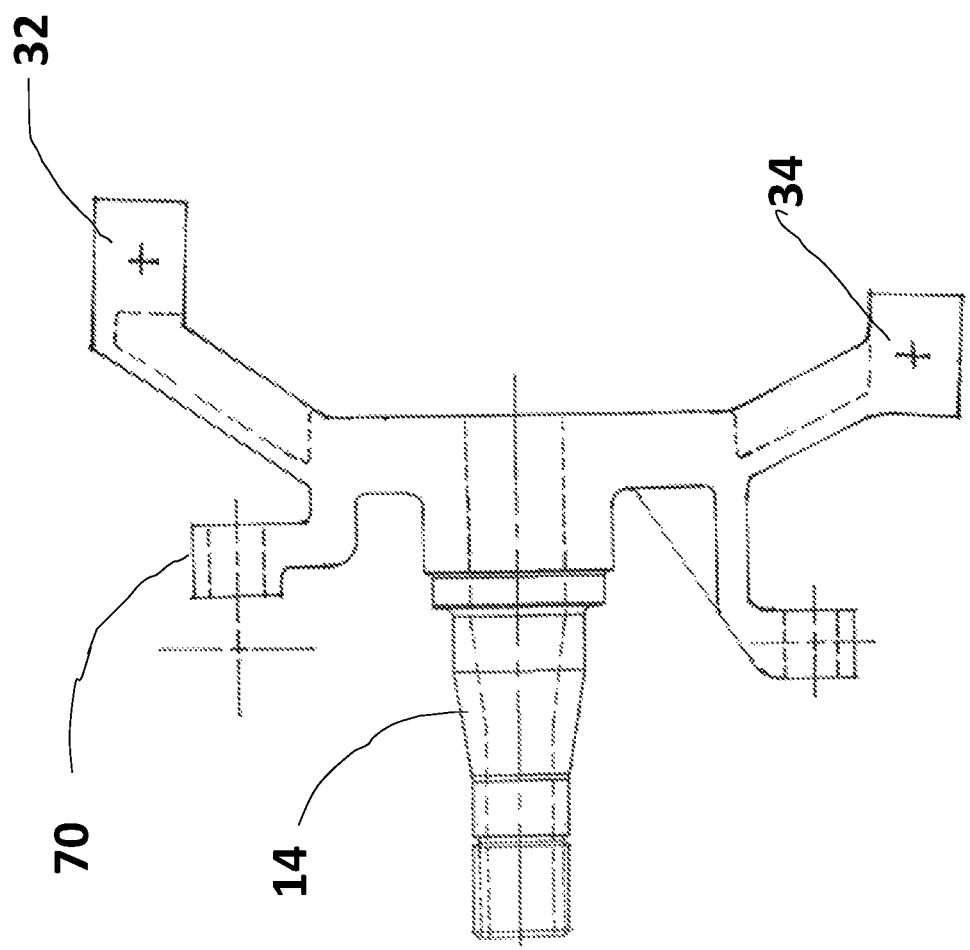

TRUCKS AND TRAILERS WITH POWER CONVERSION ELEMENTS AND SUSPENSION SYSTEMS ACCOMMODATING POWER CONVERSION ELEMENTS INBOARD OF A WHEEL

FIELD OF THE INVENTION

In some embodiments, the present invention resides in the art of trucks or trailers converting mechanical energy of a rotating wheel into electrical energy for storage and/or use. In some embodiments, the present invention resides in the art of wheel end structures keying the rotation of the wheel to power conversion units to generate electric energy. In some embodiments, the power conversion units can be employed to drive the wheel of a truck or trailer. In some embodiments, the present invention resides in the art of suspension systems for trucks and trailers, and, in particular embodiments, to suspension systems that avoid tubular axles and/or drive axles to permit the presence of elements for converting wheel rotation to electrical energy.

BACKGROUND OF THE INVENTION

The recent addition of electronic devices onto the semi-trailer has out-paced the power generation and transmission capacity of the power generating unit of the tractor. Additional electric power generation and storage must be implemented on the semi-trailer to meet this demand. Efforts are being made to make beneficial use of the kinetic energy of a truck/trailer in motion, converting the same to storable/usable electrical energy. The electric energy so generated and stored can be used to power items on a truck/trailer (reefer car, lights, virtually anything).

However, there are needs in the art for practical structures to implement such energy conversion, and the present invention provides unique structures allowing power conversion units to occupy spaces normally occupied by tubular axles or drive axles. Unique suspension systems allow for flexibility of design of suspension systems for different truck or trailer applications.

SUMMARY OF THE INVENTION

An embodiment of the present invention provides a truck or trailer comprising: a wheel, a stub axle spindle extending through the wheel and having a through bore, a step-up drive ratio unit inboard of said stub-axle spindle, an axle shaft extending through the through bore of the stub-axle spindle and operatively connected to the step-up drive ratio unit, the axle shaft rotating with the wheel, and a power conversion unit operatively connected to the step-up drive ratio unit, such that mechanical energy from rotation of the axle shaft is converted, through the step-up drive ratio unit and the power conversion unit, into electrical energy.

Another embodiment of the present invention provides a truck or trailer as in any embodiment above, further comprising a battery for storing the electrical energy.

Another embodiment of the present invention provides a truck or trailer as in any embodiment above, wherein the power conversion unit is selected from a generator and a motor-generator.

Another embodiment of the present invention provides a truck or trailer as in any embodiment above, wherein the axle shaft is connected to a hub of the wheel at an outboard end thereof.

Another embodiment of the present invention provides a truck or trailer as in any embodiment above, wherein the axle shaft is operatively connected to the step-up drive ratio unit by being keyed thereto.

Another embodiment of the present invention provides a truck or trailer as in any embodiment above, wherein the power conversion unit is a motor-generator also converting electrical energy to mechanical energy for rotation of the axle shaft.

Another embodiment of the present invention provides a truck or trailer as in any embodiment above, further comprising a second motor-generator operatively connected to the step-up drive ratio unit.

Another embodiment of the present invention provides a truck or trailer as in any embodiment above, further comprising a suspension system comprising: an upper mounting bracket extending from the stub-axle spindle; and a lower mounting bracket extending from the stub-axle spindle, wherein the suspension system provides room for the axle shaft and step-up ratio drive unit.

Another embodiment of the present invention provides a truck or trailer as in any embodiment above, wherein the suspension system further comprises an air spring having a direction of expansion and contraction, the air spring being mounted such that the direction of expansion and contraction is off of vertical.

Another embodiment of the present invention provides a truck or trailer as in any embodiment above, wherein the suspension system further comprises: an upper control arm pivotally secured to the upper mounting bracket to pivot about an upper control arm pivot point; a lower control arm pivotally secured to the lower mounting bracket to pivot about a lower control arm pivot point; an upper frame mounting structure mounting the suspension system to the truck or trailer, the upper control arm being pivotally secured to the upper frame mounting structure at an upper frame mounting structure pivot point; a lower frame mounting structure mounting the suspension system to the truck or trailer, the lower control arm being pivotally secured to the lower frame mounting structure at a lower frame mounting structure pivot point.

Another embodiment of the present invention provides a truck or trailer as in any embodiment above, wherein a line between the upper frame mounting structure pivot point and the lower frame mounting structure pivot point is perpendicular to the direction of expansion and contraction of the air spring.

Another embodiment of the present invention provides a truck or trailer as in any embodiment above, wherein the air spring is mounted between a lower control arm spring support plate secured to the lower control arm, and an upper control arm spring support plate secured to the upper control arm such that expansion of the air spring pushes against said lower control arm spring support plate and the upper control arm spring support plate, resulting in a lifting of the upper frame mounting structure relative to the upper control arm pivot point and a lifting of the lower frame mounting structure relative to the lower control arm pivot point.

Another embodiment of the present invention provides a truck or trailer as in any embodiment above, further comprising an opposed wheel forming a wheel pair with the wheel, the suspension system further comprising: an opposed upper mounting bracket extending from an opposed stub-axle spindle; an opposed lower mounting bracket extending from the opposed stub-axle spindle, an opposed upper control arm pivotally secured to the opposed upper mounting bracket to pivot about an opposed upper control arm pivot point; an opposed lower control arm pivotally secured to the lower mounting bracket to pivot about a lower control arm pivot point, wherein the opposed upper control arm is pivotally secured to the upper frame mounting structure at an opposed upper frame mounting structure pivot point, and the opposed lower control arm is pivotally secured to the lower frame mounting structure at an opposed lower frame mounting structure pivot point.

Another embodiment of the present invention provides a truck or trailer as in any embodiment above, wherein the air spring is an upper air spring, and the truck or trailer further comprises a lower air spring, and further wherein: the upper air spring is mounted between an upper control arm spring support plate secured to the upper control arm and an opposed upper control arm spring support plate secured to the opposed upper control arm such that expansion of the upper air spring pushes against said upper control arm spring support plate and the opposed upper control arm spring support plate resulting in a lifting of the upper frame mounting structure, as the upper control arm pivots about the upper control arm pivot point and the opposed upper control arm pivots about the opposed upper control arm pivot point; and the lower air spring is mounted between a lower control arm spring support plate secured to the lower control arm and an opposed lower control arm spring support plate secured to the opposed lower control arm such that expansion of the lower air spring pushes against the lower control arm spring support plate and the opposed lower control arm spring support plate resulting in a lifting of the lower frame mounting structure, as the lower control arm pivots about the lower control arm pivot point and the opposed lower upper control arm pivots about the opposed lower control arm pivot point.

An embodiment of the present invention provides a truck or trailer comprising: a wheel; a stub axle spindle extending through the wheel; and a suspension system comprising: an upper mounting bracket extending from the stub axle spindle; a lower mounting bracket extending from the stub axle spindle; and an air spring having a direction of expansion and contraction, the air spring being mounted such that the direction of expansion and contraction is off of vertical; an upper control arm pivotally secured to the upper mounting bracket to pivot about an upper control arm pivot point; a lower control arm pivotally secured to the lower mounting bracket to pivot about a lower control arm pivot point; an upper frame mounting structure mounting the suspension system to the truck or trailer, the upper control arm being pivotally secured to the upper frame mounting structure at an upper frame mounting structure pivot point; a lower frame mounting structure mounting the suspension system to the truck or trailer, the lower control arm being pivotally secured to the lower frame mounting structure at a lower frame mounting structure pivot point.

Another embodiment of the present invention provides a truck or trailer as in any embodiment above, wherein a line between the upper control arm pivot point and the lower control arm pivot point is perpendicular to the direction of expansion and contraction of the air spring.

An embodiment of the present invention provides a truck or trailer comprising: a wheel; a stub axle spindle extending through the wheel; a step-up drive ratio unit inboard of said stub-axle spindle, an axle shaft extending through the through bore of the stub-axle spindle and operatively connected to the step-up drive ratio unit, the axle shaft rotating with the wheel, a power conversion unit operatively connected to the step-up drive ratio unit, such that mechanical energy from rotation of the axle shaft is converted, through the step-up drive ratio unit and the power conversion unit, into electrical energy; and a suspension system comprising: an upper mounting bracket extending from the stub axle spindle; a lower mounting bracket extending from the stub axle spindle; and an air spring having a direction of expansion and contraction, the air spring being mounted such that the direction of expansion and contraction is off of vertical; an upper control arm pivotally secured to the upper mounting bracket to pivot about an upper control arm pivot point; a lower control arm pivotally secured to the lower mounting bracket to pivot about a lower control arm pivot point; an upper frame mounting structure mounting the suspension system to the truck or trailer, the upper control arm being pivotally secured to the upper frame mounting structure at an upper frame mounting structure pivot point; a lower frame mounting structure mounting the suspension system to the truck or trailer, the lower control arm being pivotally secured to the lower frame mounting structure at a lower frame mounting structure pivot point.

BRIEF DESCRIPTION OF THE DRAWINGS

FIG. 9 is a general schematic of the communication between the axle shaft and the step-up drive ratio unit, the power conversion unit, and a battery.

FIG. 22B is a cross-sectional view of a suspension system in accordance with this invention shown on a single wheel truck as a rear drive axle.

FIG. 29 shows mounting brackets and a drum brake bracket all of a unitary structure with a stub axle spindle.

DETAILED DESCRIPTION OF ILLUSTRATIVE EMBODIMENTS

Figure 1:
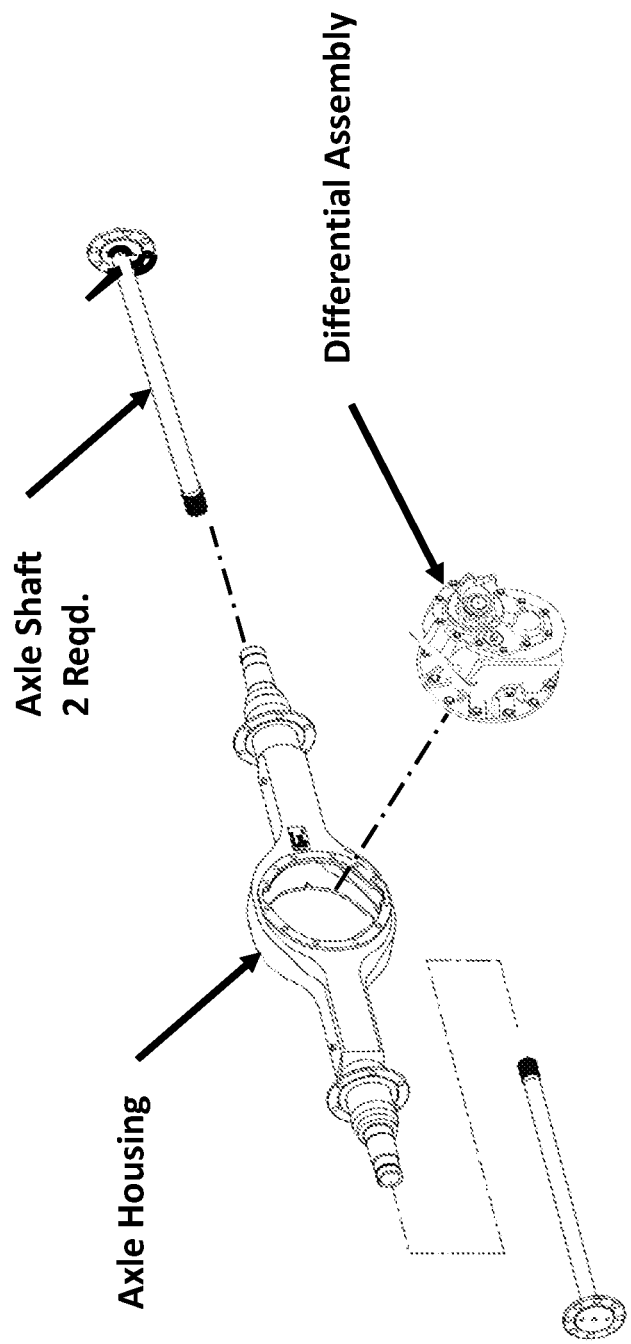
FIG. 1 is an assembly view of a standard drive axle of the prior art.

The present invention addresses many needs in the art by incorporating a power conversion unit at a wheel end of a truck or trailer. As used herein, the term truck includes tractors and any other power unit, while trailer is understood to include any number of transport structures, including vans, flatbeds, reefers, car carriers, etc. as know to those in the art. The drive axles (FIG. 1, prior art) or tubular axles (FIG. 2, prior art) of a truck or trailer are adapted herein to allow mounting of a power conversion unit to interact with an axle shaft extending through a stub axle spindle. The present invention also provides unique suspension systems that are particularly suitable for permitting the mounting of the power conversion unit where drive axles and tubular axles would normally prohibit. The present invention provides motor-generator power conversion units to not only produce electrical energy for storage but also convert electrical energy to mechanical energy to drive wheels of a truck or trailer. The present invention can be implemented in a variety of truck or trailer environments (single wheel, dual wheel, steerable wheel).

Figure 3:
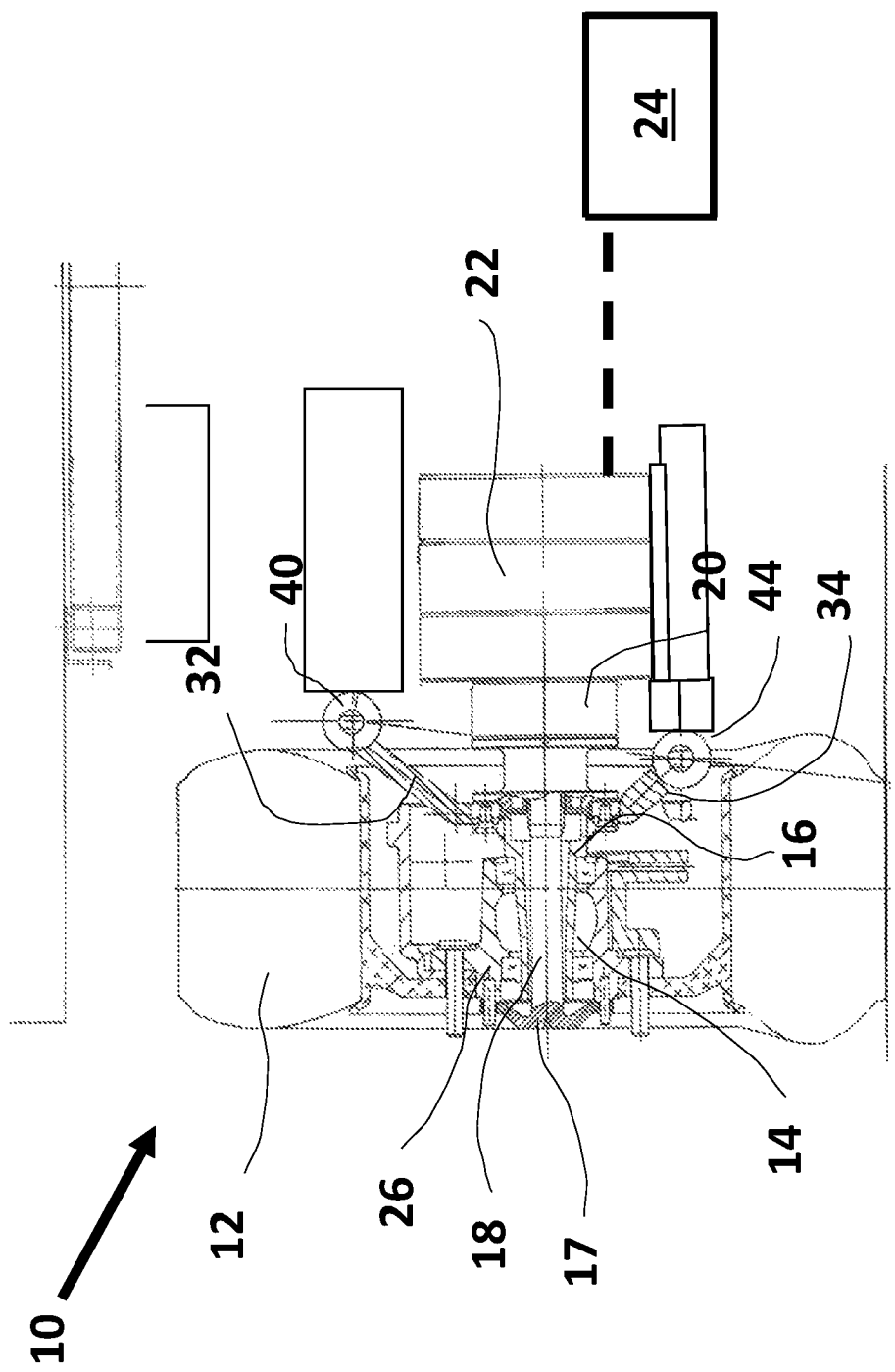
FIG. 3 is a cross-sectional view of a wheel end in accordance with an embodiment of this invention, showing the use of a power conversion unit.
Figure 4:
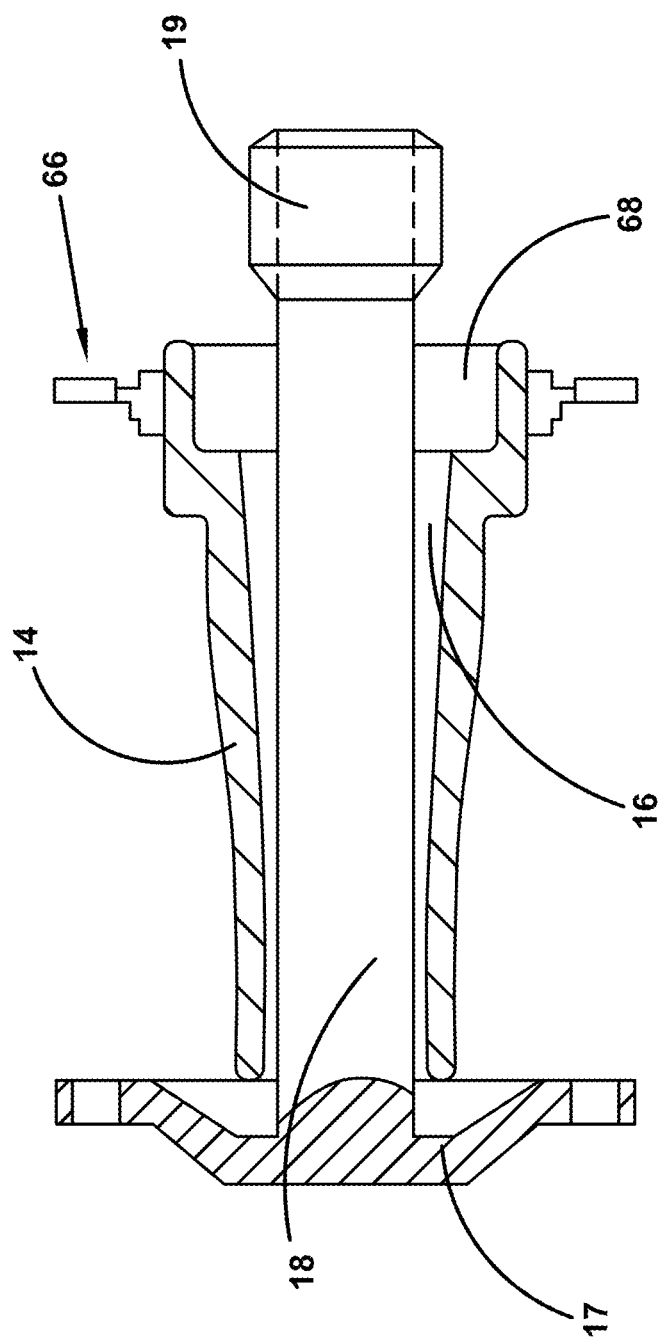
FIG. 4 is a cross-sectional view of a stub axle spindle and axle shaft interaction in accordance with this invention.
Figure 6:
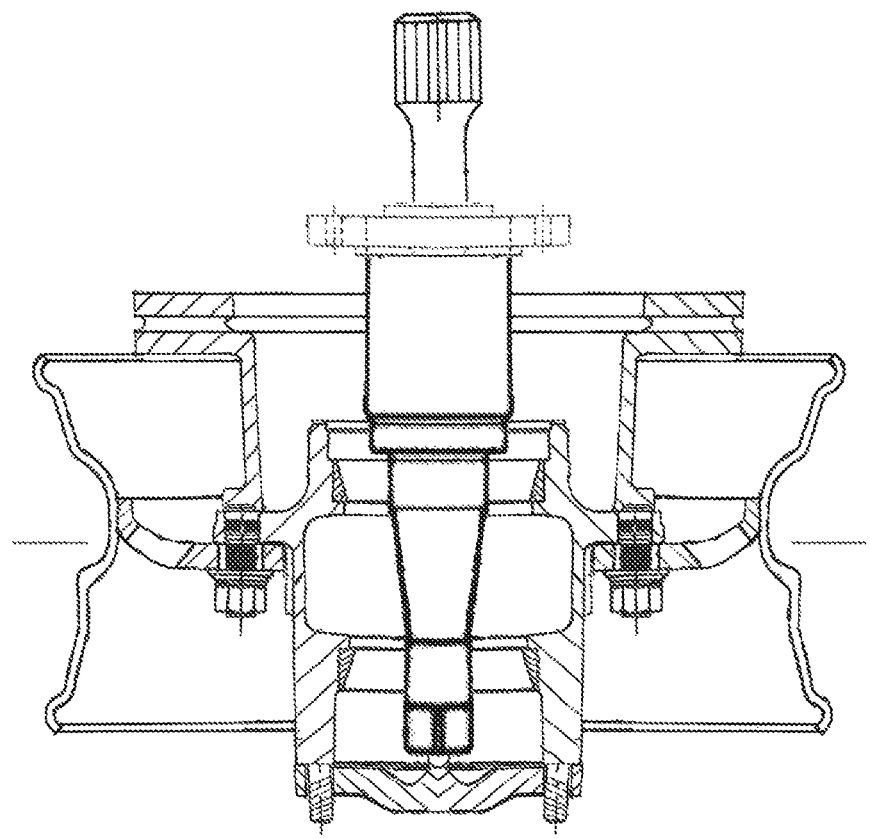
FIG. 6 is a cross-sectional view of the implementation of the stub axle spindle and axle shaft in a single wheel having a disc brake.
Figure 5:
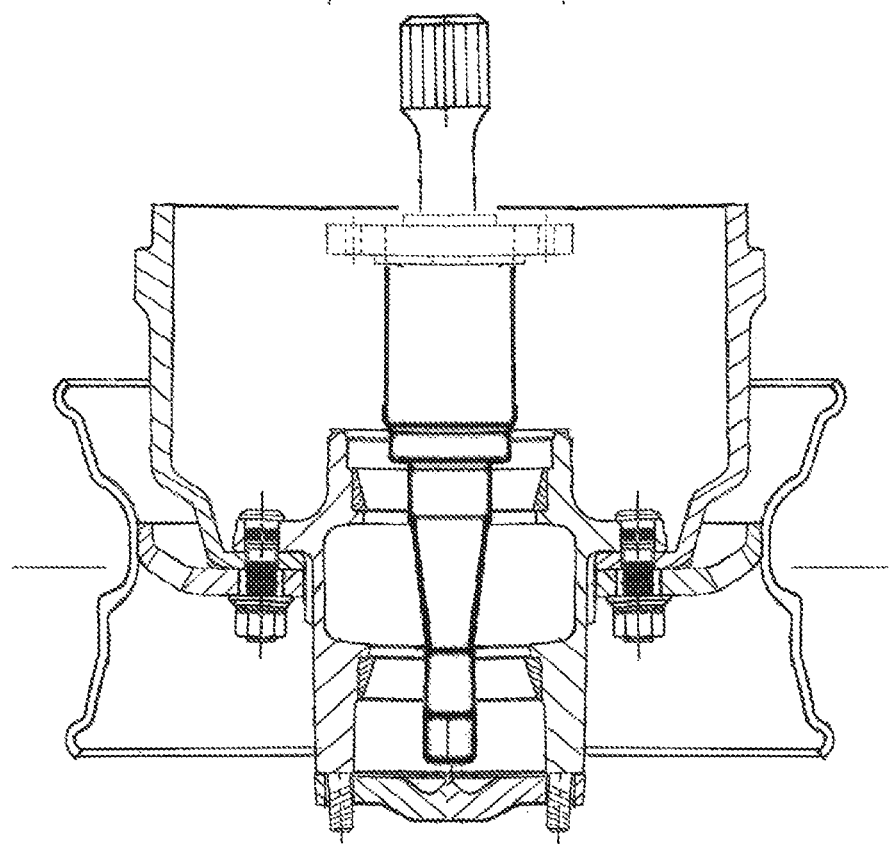
FIG. 5 is a cross-sectional view of the implementation of the stub axle spindle and axle shaft in a single wheel having a drum brake.
Figure 8:
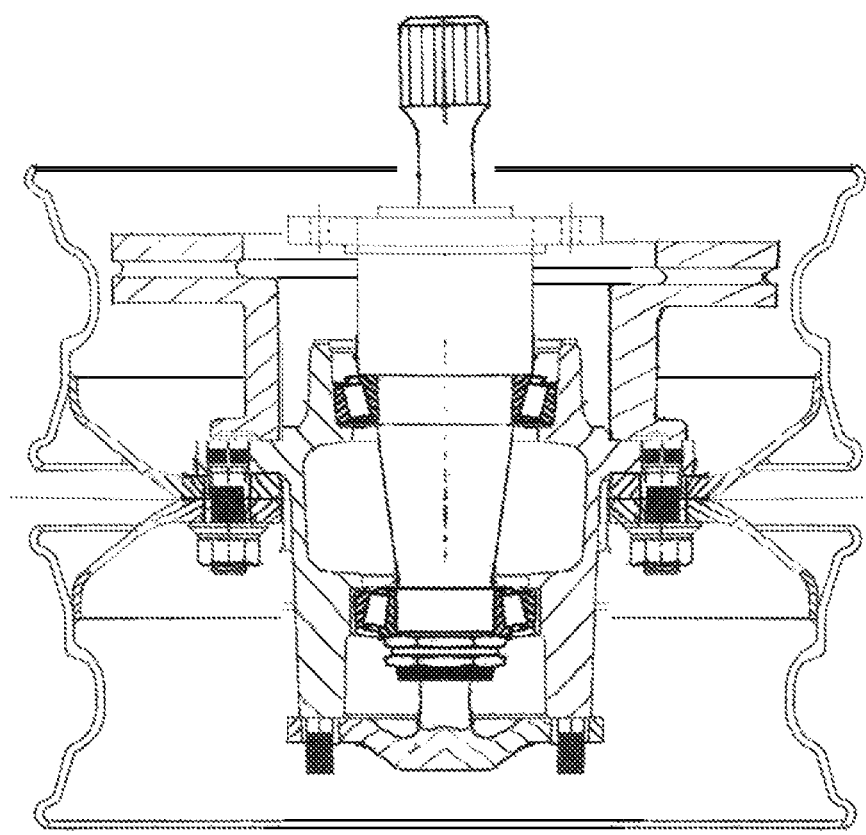
FIG. 8 is a cross-sectional view of the implementation of the stub axle spindle and axle shaft in a dual wheel having a disc brake.
Figure 7:
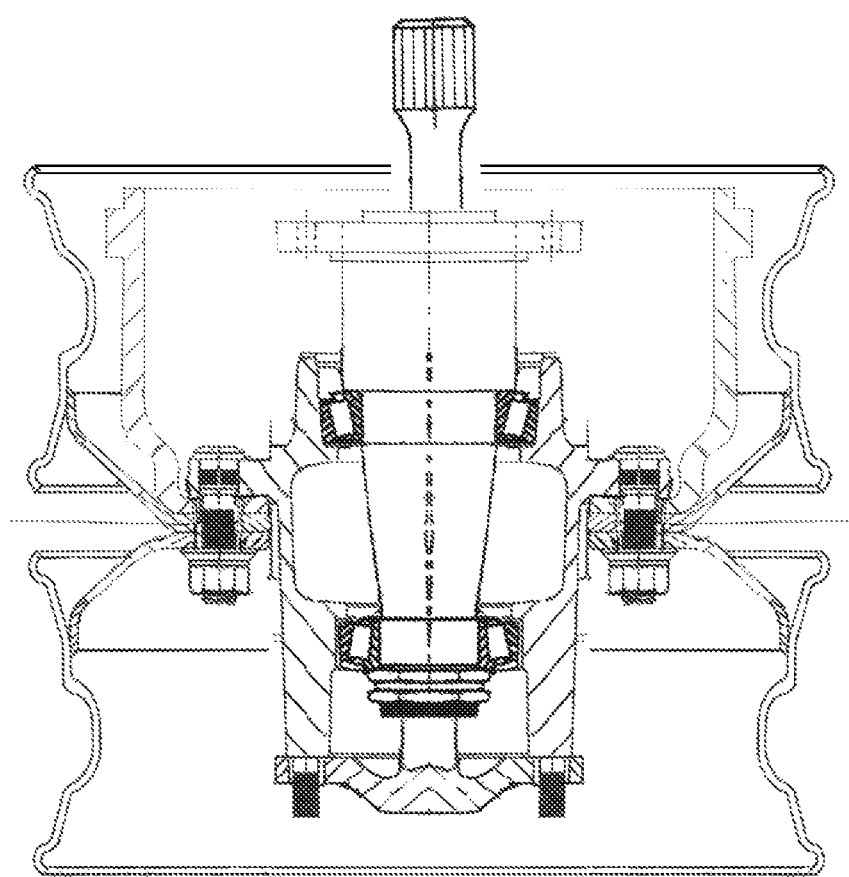
FIG. 7 is a cross-sectional view of the implementation of the stub axle spindle and axle shaft in a dual wheel having a drum brake.

With reference to FIGS. 3 and 4, a truck or trailer 10 has a wheel 12, with a stub axle spindle 14 extending through the wheel 12 and having a through bore 16 through which extends an axle shaft 18. A step-up drive ratio unit 20 is positioned inboard of the stub axle spindle 14, and the axle shaft 18 is operatively connected to the step-up drive ratio unit 20. A power conversion unit 22 is operatively connected to the step-up drive ratio unit 20 such that mechanical energy from the rotation of the axle shaft 18 is converted, through the step-up drive ratio unit 20 and the power conversion unit 22, into electrical energy. The truck or trailer 10 can include one or more batteries 24 for storing the electrical energy.

The axle shaft 18 is mounted to the hub 26 of the wheel 12, at a head portion 17 to rotate therewith. The head portion 17 is secured to the hub 26 for example with bolts. The particular wheel 12 shown in FIG. 3 includes a hub 26 that is a drive-configuration hub, like those on the drive axle of a truck, but nevertheless can be considered a wheel of either a truck or trailer in accordance with this invention, because, as will be later appreciated, the present invention allows for driving of the wheel of a truck or trailer with the very power conversion unit 22 and step-up drive ratio unit 20 that serve to produce the electrical energy. However, this is just one particular embodiment, and it will be appreciated that, with the use of a stub axle spindle, the present invention can be incorporated into any type of wheel configuration, as seen in the various embodiments of FIGS. 4-7 and 16-26, showing single and dual wheel configurations with drum or disc brakes and steerable wheel configurations as well.

The axle shaft 18 can be operatively connected to the step-up drive ratio unit 20 in any appropriate fashion such that the rotation of the axle shaft 18 due to rotation of the wheel 12 manipulates the step-up drive ratio unit 20 to drive the power conversion unit 22 to which it is operatively connected. This might be accomplished with male and female mating members, pulleys, splines, etc. In some embodiments, the axle shaft 18 is keyed to the step-up drive ratio unit 20, and, in the particular embodiments shown, the inboard end 19 of the stub axle spindle 14 is splined and mates with similarly splined receipt 28 of the step-up drive ratio unit 20. In some embodiments, there is a coaxial, direct drive between the axle shaft 18 and part of the step-up drive ratio unit with which the axle shaft 18 is operatively connected.

Figure 10:
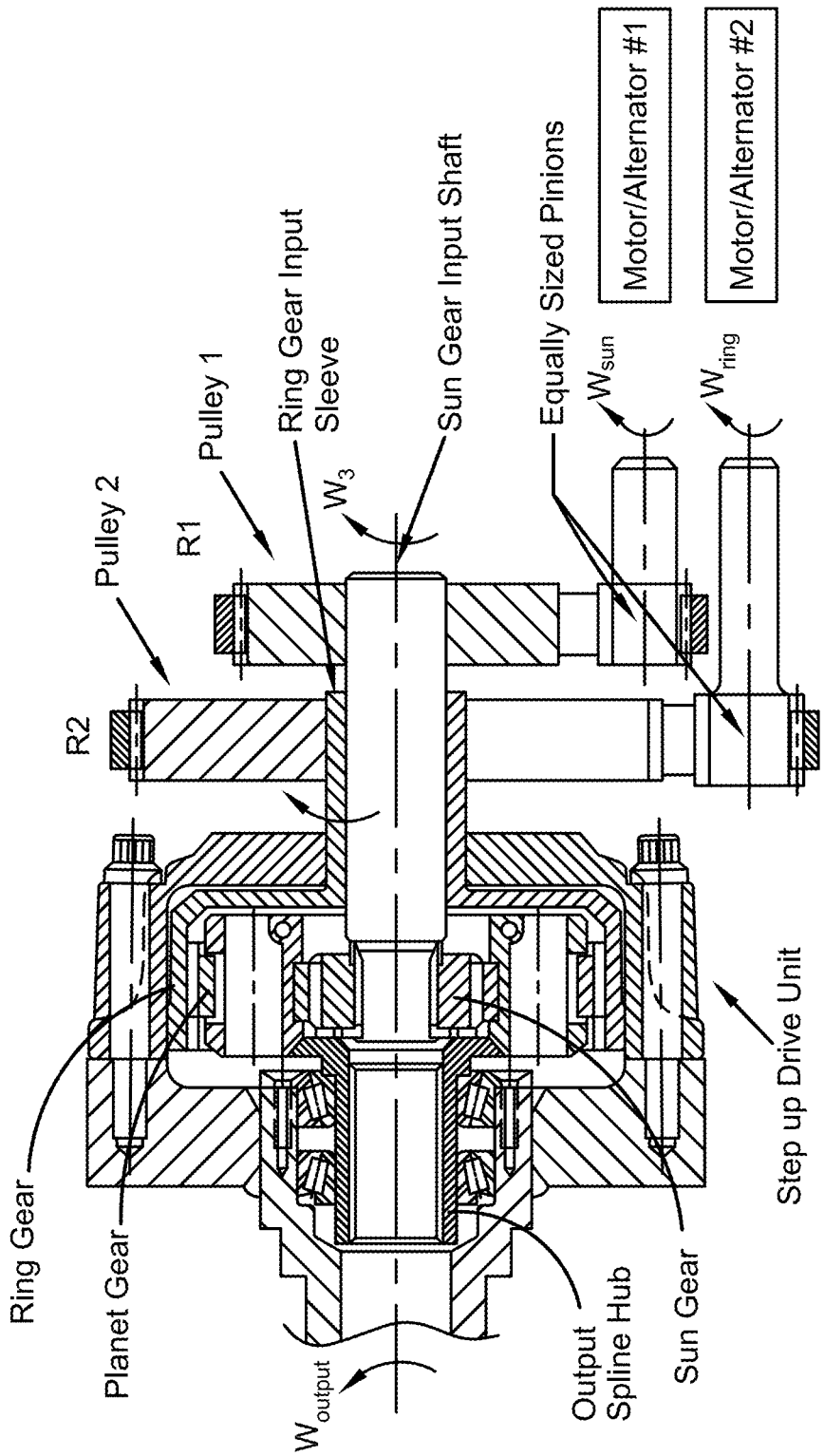
FIG. 10 is a general cross-sectional view of a planetary gear-type step-up drive ratio unit with belt reduction pulleys.
Figure 11:
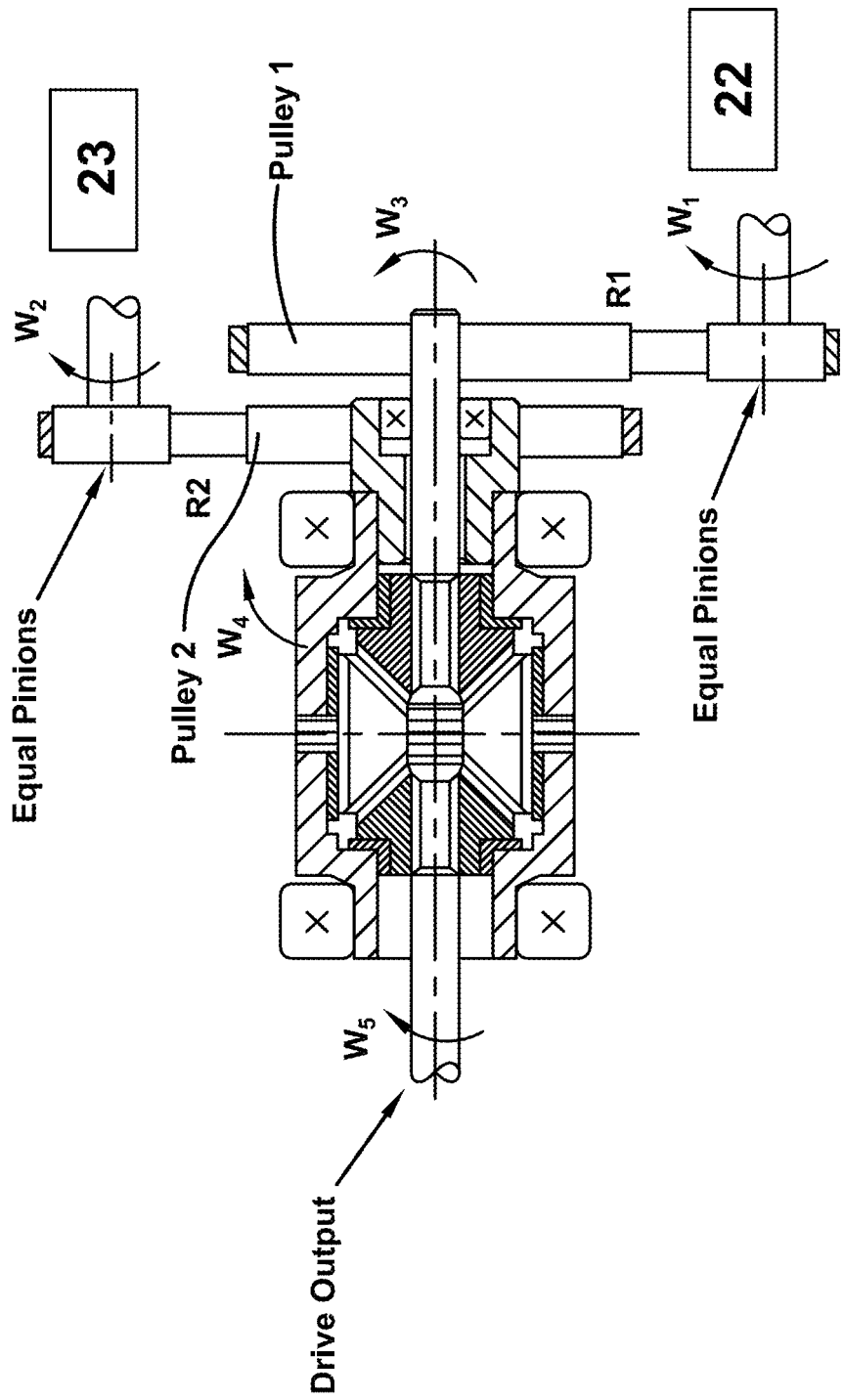
FIG. 11 is a general cross-sectional view of an open differential drive unit.
Figure 12:
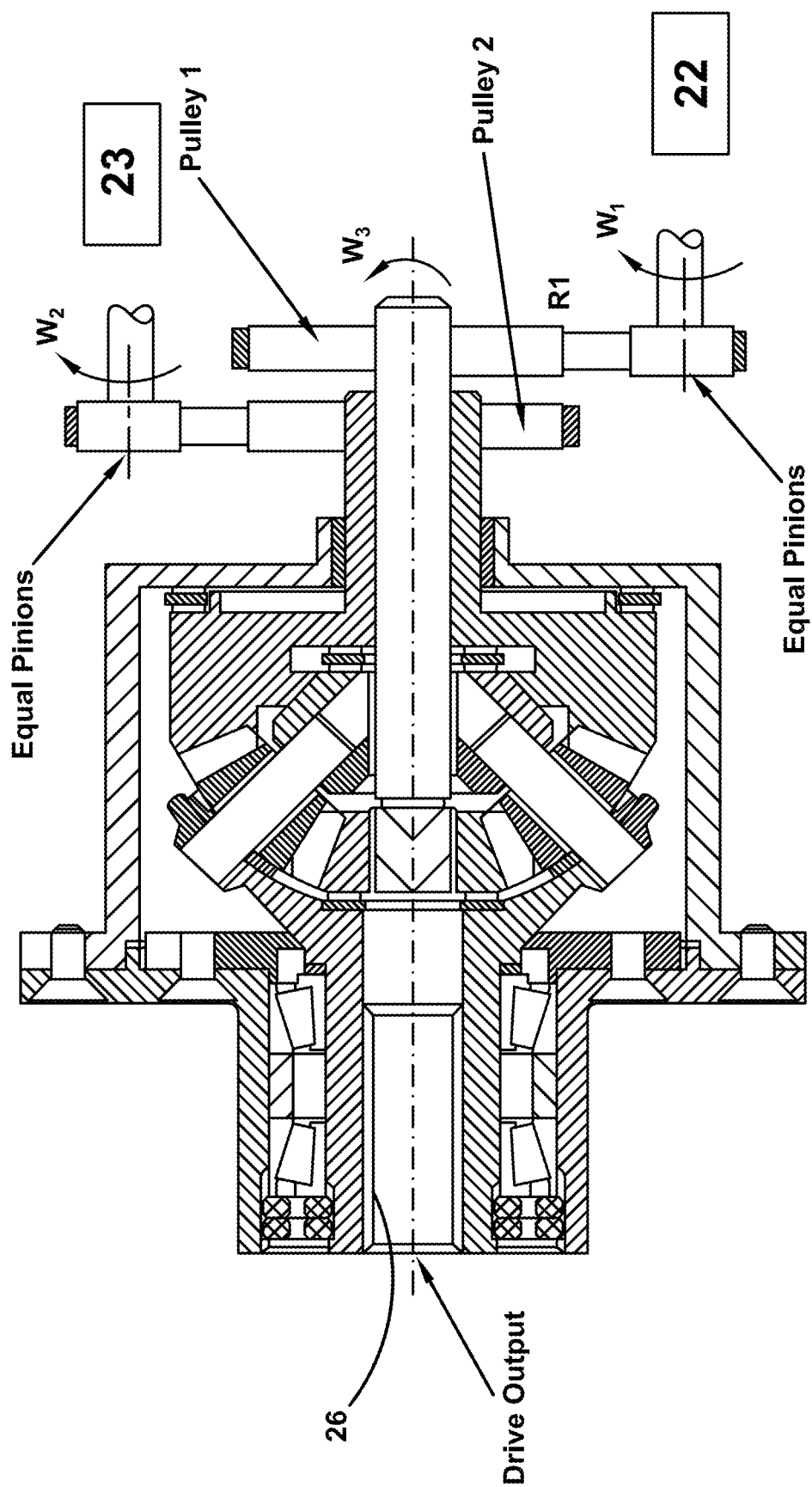
FIG. 12 is a general cross-sectional view of a bevel gear differential drive unit.

The step-up drive ratio unit 20 can be any unit sufficient to receive the mechanical energy input from the axle shaft 18 and increase ("step up") the rotation speed at an output to the power conversion unit 22. In some embodiments, as schematically represented in FIG. 9, the splined inboard end 19 of the axle shaft 18 mates with the splined receipt 28 of a two-stage, step-up drive ratio unit 20 having gearing in known fashion, as shown and appreciated in the drawings. By way of further example only, the step-up drive ratio unit 20, in some embodiments, can be a planetary drive unit (FIG. 10), an open differential drive unit (FIG. 11), or a bevel gear differential drive unit (FIG. 12).

Figure 13:
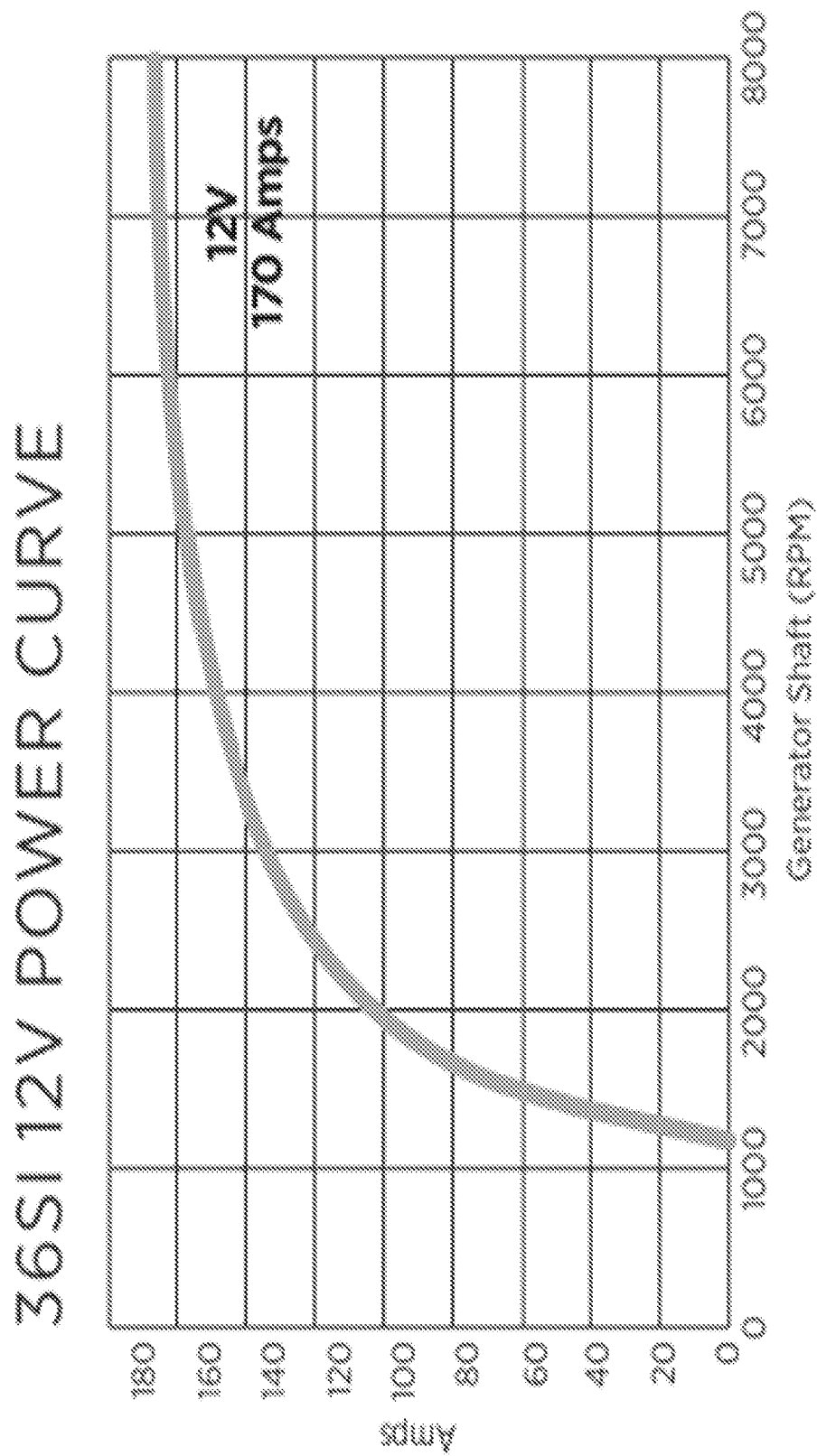
FIG. 13 is a power curve showing amps as a function of generator shaft revolutions per minute for a 36SI 12V unit.

In some embodiments, the ratio for the step-up drive ratio unit is calculated by dividing the rated output shaft speed of the power conversion unit by the rotation rate factor of the tire mounted on the spindle and flange. For example, a Remy 36SI unit FIG. 13 is rated to produce 170 Amps at 7,000 rpm. A 11R22.5 tire has a rotation rate factor of 525 revolutions per mile of travel. As a result, a trailer traveling one mile in one minute, will make 525 revolutions per minute. Also, one mile per minute is equal to 60 miles per hour. Therefore, 525 revolutions per minute of the tire equals 60 MPH. The trailer can travel at speeds of 75 MPH, so the tire rotation rate will then be $$R \text{ tire rotation rate, at } 75 = (525)*(75/60) = 656.25 \text{ (use 656)}.$$

The rated output shaft speed of the power conversion unit is divided by the tire rotation rate factor for 75 MPH to yield the step-up drive ratio unit ratio:

$$R \text{ drive unit} = 7000/656 = 10.6707$$

This ratio can be broken up between the two stages in any appropriate way desirable. An equal ratio scenario would indicate the square root of the 10.6707 number be used, or 3.2666, in each stage. So, for this exemplary guidance, the step-up drive ratio unit is to be designed using these values.

In some embodiments, the power conversion unit 22 is a generator, converting mechanical energy to electrical energy. This could be particularly implemented on freewheeling trailer wheels, such that power from the rotation of the wheels can be converted to charge onboard batteries for powering other items of the trailer, for example, the refrigeration of a reefer trailer, but virtually any electric component.

Figure 14A:
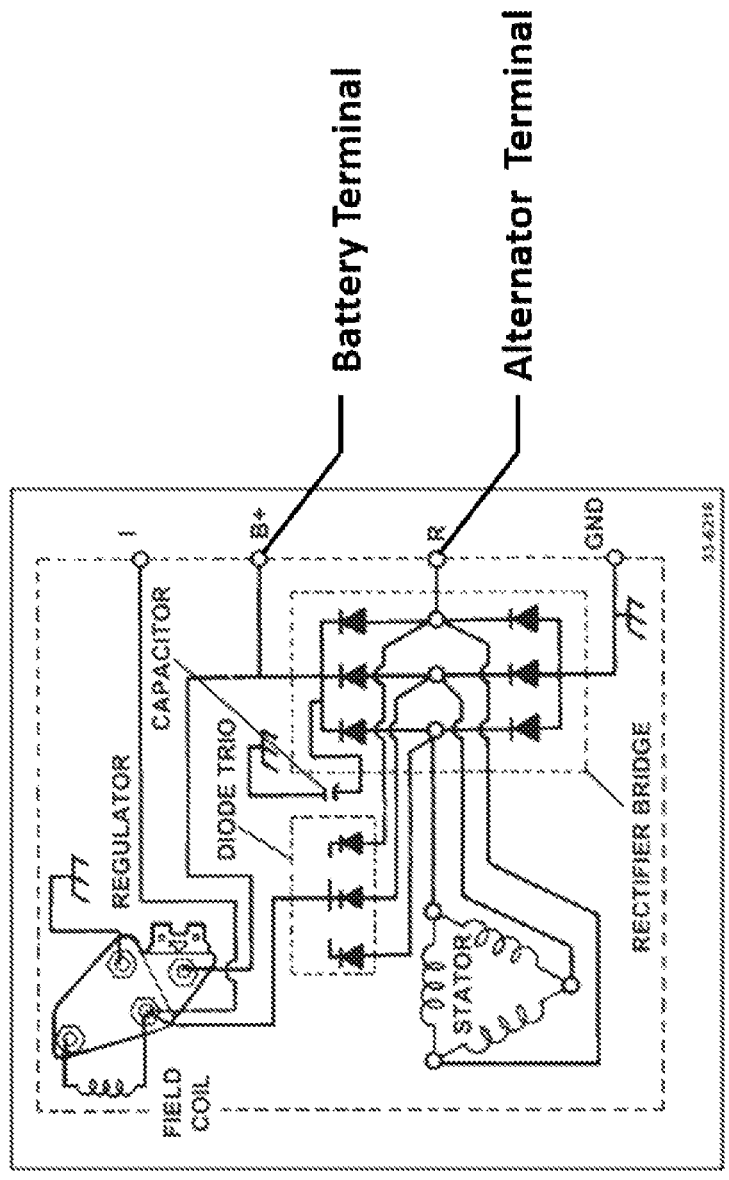
FIGS. 14A and 14B show regulatory circuitry for a power conversion unit.
Figure 14B:
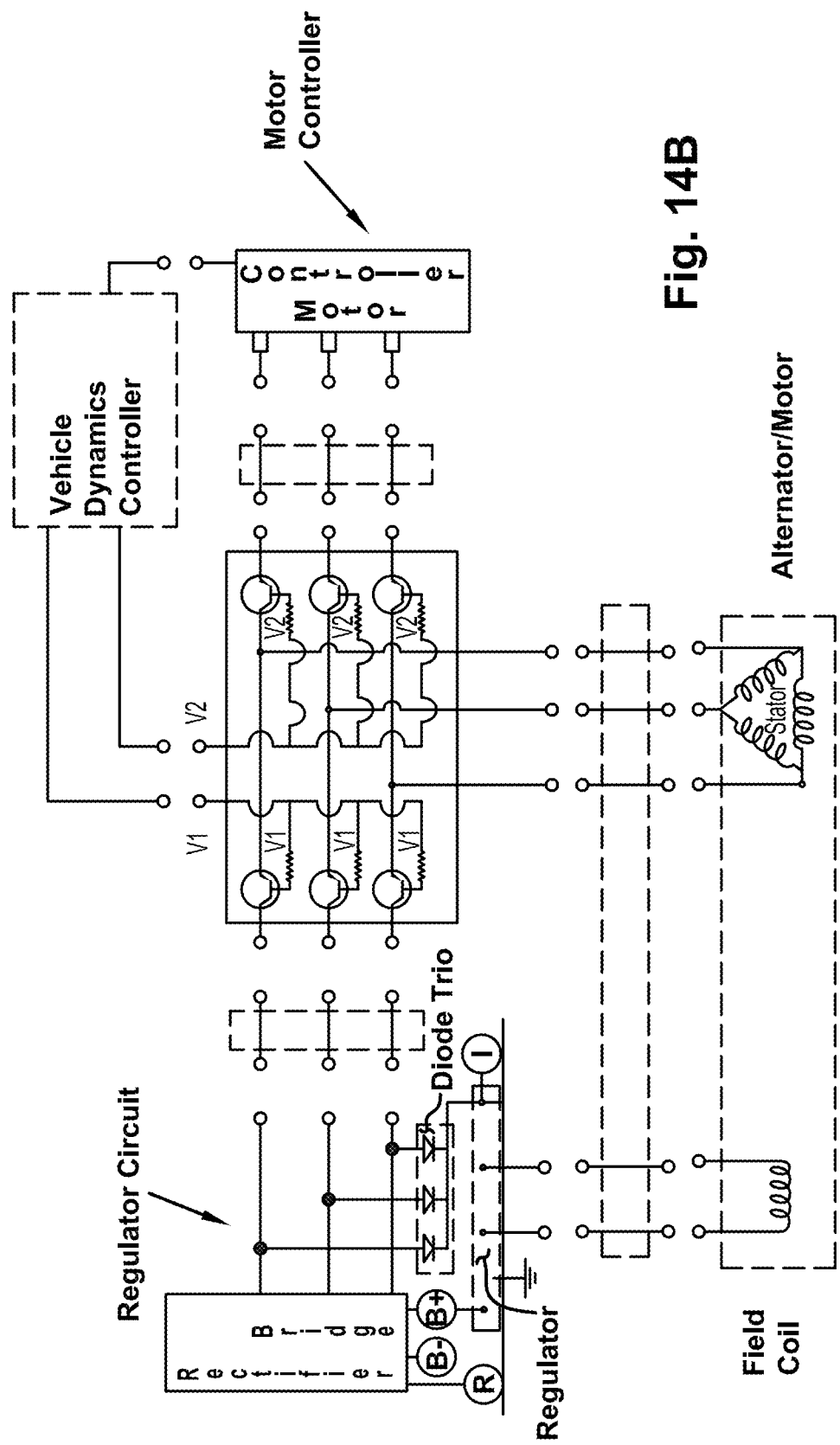

The power conversion unit generates power through the normal regulator circuitry (FIG. 14A) built into the unit (e.g. alternator) to maintain the charge on the battery pack. A vehicle dynamics controller unit controls power conversion under numerous additional operating conditions, such as, during vehicle slowing or emergency braking events, termed regenerative braking (FIG. 14B).

In other embodiments the power conversion unit 22 is a motor-generator that also converts electrical energy to mechanical energy, and thus is used to not only convert the rotation of the wheels to storable electric energy but also to convert that stored energy to mechanical energy to drive the wheels. In such embodiments, the step-up drive ratio unit 20 also serves as a reduction drive unit when taking the much higher speed rotation of the motor-generator power conversion unit 22 and appropriately reducing it for driving the wheel.

In some motor-generator embodiments, the power provided by one motor generator will not be sufficient to appropriately drive the truck or trailer (more on this herein below), and thus a second power conversion unit 23 (motor-generator; see FIG. 10) is operatively connected to the step-up drive ratio unit 20. See FIGS. 10, 11, 12, wherein, according to some such embodiments, the step-up drive ratio unit is replaced by a planetary differential, an open differential, or a bevel gear differential unit. Each of these drive units has a pinion gear shaft which is concentric to the entire unit and an outer ring gear, a housing, or a large bevel gear component, respectively, as the second input shaft feature. This unit is driven by two separate motor/alternators in a "dual motor" configuration whereby motor 1 drives the concentric shaft and the motor 2 drives the outer ring gear, the housing, or the large bevel gear, respectively. When these types of reduction gear sets are used, there is always a speed reduction ratio difference for input 1 to be rotated while input 2 is held fixed, or for input 2 to be rotated while input 1 is held fixed. It would be convenient to have the motor speeds be of a relationship that would allow their shaft speeds to be directly related without laborious calculations needing to be performed continually. To accomplish this, the motors are connected to input shaft 1 and to input shaft 2 through pulleys or gears of differing sizes that compensate for these ratio differences.

For example, in a planetary gear-type step-up drive ratio unit with belt reduction pulleys (FIG. 10) included, the output rotation rate is $$\omega out = (1/(R1*R\ sun))*\omega 1 + (1/(R2*R\ ring))*\omega 2 \quad (1)$$

wherein
R1=Reduction ratio of pulley set 1,
R2=Reduction ratio of pulley set 2,
R sun=Reduction ratio of planetary gear set for input 1, and
R ring=Reduction ratio of planetary gear set for input 2.
Now, if ω out=0, then, $$(1/(R1*R\ sun))*\omega 1 + (1/(R2*R\ ring))*\omega 2 = 0,\ and,$$

$$\omega 2 = -((R2*R\ ring)/(R1*R\ sun))*\omega 1$$

$$= -(R2/R1)*(R\ ring/R\ sun)*\omega 1 \quad (2).$$

Using the ratio values for a 26-tooth sun and a 64-tooth ring planetary gear set, R sun=3.4615 and R ring=1.4063, such that $$\omega 2 = -(R2/R1)*(1.4063/3.4615)*\omega 1.$$

If ω2=−ω1, then $$(R2/R1)*(1.4063/3.4615) = 1$$

$$R2 = 1/(0.4063)*R1 = 2.6414*R1 \quad (3).$$

Substituting (3) into (1)

$$\omega out = \omega 1/(R1*R\ sun) + \omega 2/(2.4614*R1*R\ ring) \quad (4),$$

and in this example, $$(R2/R1)*(R\ ring/R\ sun) = (R2*R\ ring)/(R1*R\ sun) = 1,$$

$$(R2*R\ ring) = (R1*R\ sun) \quad (5).$$

Substituting (5) into (1), $$\omega out = (1/(R1*R\ sun))*\omega 1 + (1/(R1*R\ sun))*\omega 2,\ and$$

$$\omega out = (1/(R1*R\ sun))*(\omega 1 - \omega 2) \quad (6).$$

The Total Reduction Ratio of the Pulley/Differential Set is the right-side coefficient in (6), $$R\ Total = 1/(R1*R\ sun) \quad (7).$$

With the input 2 pulley sized to be 2.4614 times the input 1 pulley, and the same size pulley on both motor shafts, the shaft speeds of the motors can be directly added to establish the output shaft speed when divided by the total reduction ratio factor.

This arrangement of the two motors permits the output shaft speed to be controlled very precisely and for rapid speed changes through the manipulation of the speed of only one motor. This is advantageous in stability control systems that use torque vectoring control schemes.

Figure 15:
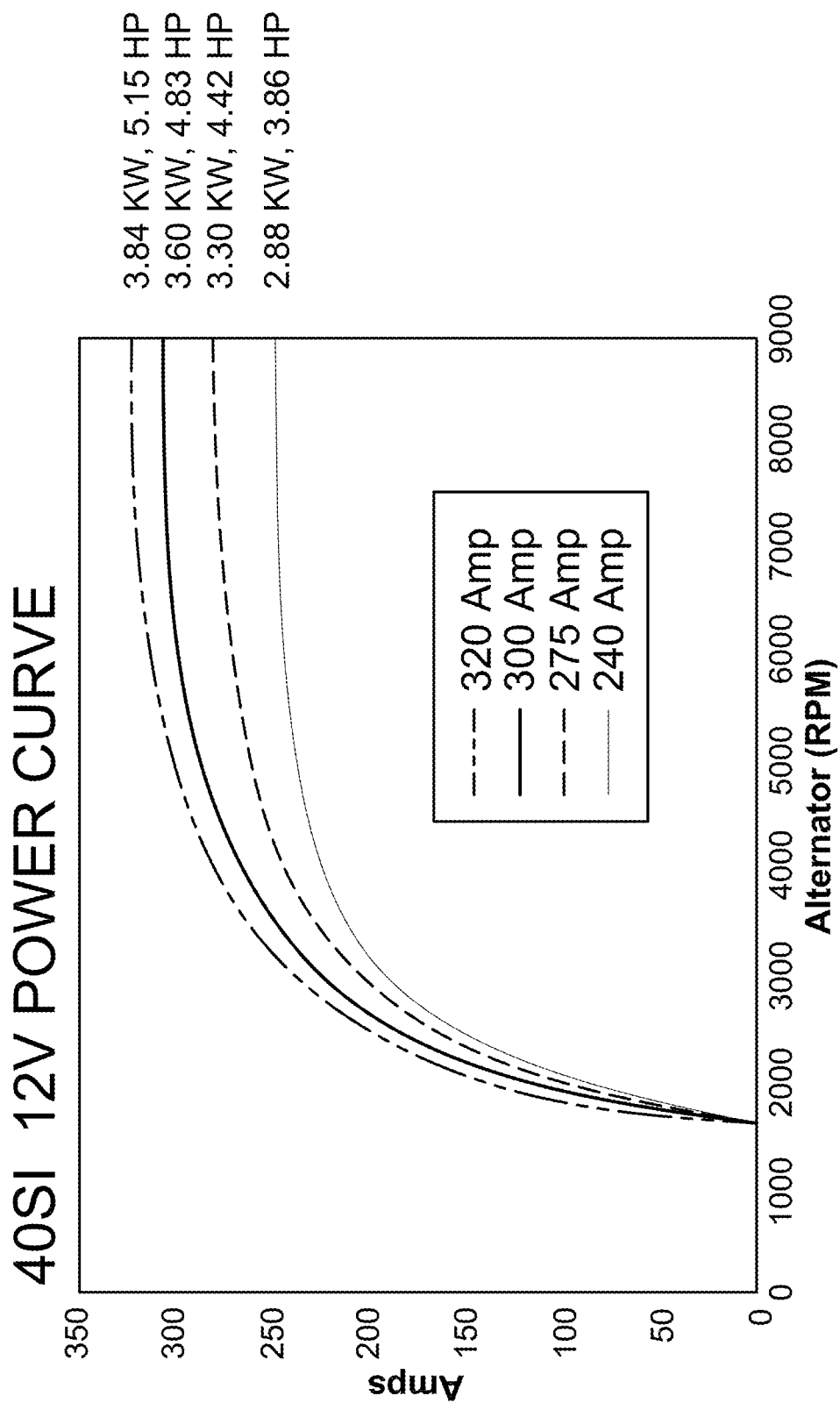
FIG. 15 is a power curve showing amps as a function of generator shaft revolutions per minute for a Remy 40SI unit.

The Remy 40SI unit as a motor could provide between 3.86 to 5.15 Horsepower (FIG. 15). Referencing the Total Reduction Ratio for the example dual motor planetary differential unit with a reasonable value of R1=6, then $$1/(R1*R\ sun) = 1/(6*3.4615) = 20.5290.$$

Then the available output horsepower would be between 79.3 to 105.7 HP per wheel end and 158.6 to 211.5 HP per axle.

In some embodiments, the generator is a motor-generator in the form of a standard alternator modified to provide the advantages of, selectively, being an alternator or a motor by removing the regulator circuitry from the interior of the alternator and relocating it remotely near the motor control electronics and vehicle dynamics controller through a wiring harness. See FIG. 14B. Each of the three stator coil lines of the alternator are individually wired in parallel with the regulator and with a motor controller output pin for that phase. Selection of which function the unit will perform is controlled by transistors in each stator phase line between the regulator and the motor controller. The device connected to the stator coils is controlled by whether v1 or v2 is in a HIGH status as established by the vehicle dynamics controller.

The focus has been on the stub axle spindle, axle shaft, step-up drive ratio unit, and conversion unit at a single wheel, but it is readily appreciated that, in some embodiments, the structure can be repeated at the opposing wheel at the other side of the truck or trailer. These wheel pairs would typically be joined by a tubular axle (in the case of trailers) or drive axles (in the case of driven wheels of a truck), but notably, the present invention can provide trailer wheel pairs that are not joined by a tubular axle, and truck wheel pairs that are not joined by a drive axle, as the axle shaft 18 operates in the space the tubular axle/drive axle would normally occupy.

In some embodiments, a suspension system is adapted for use between wheel pairs in the truck or trailer, avoiding a tubular axle or drive axle, and providing useful space for the axle shaft 18, step-up drive ratio unit 20, and power conversion units 22 as described above. These suspension systems, while useful for practicing other aspects of the invention relating to power conversions, are separately useful.

Figure 16:
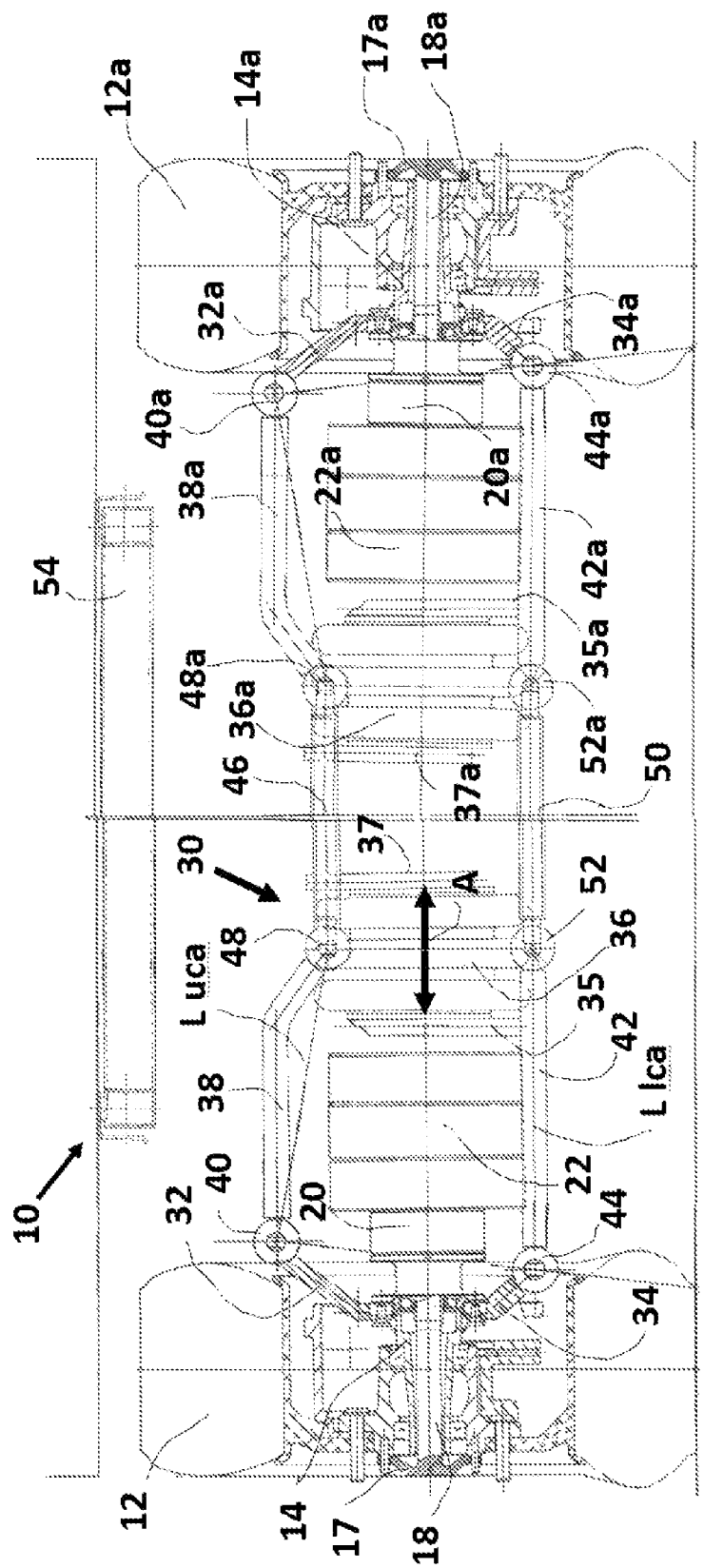
FIG. 16 is a cross-sectional view of a suspension system in accordance with this invention shown on a single wheel trailer.
Figure 17:
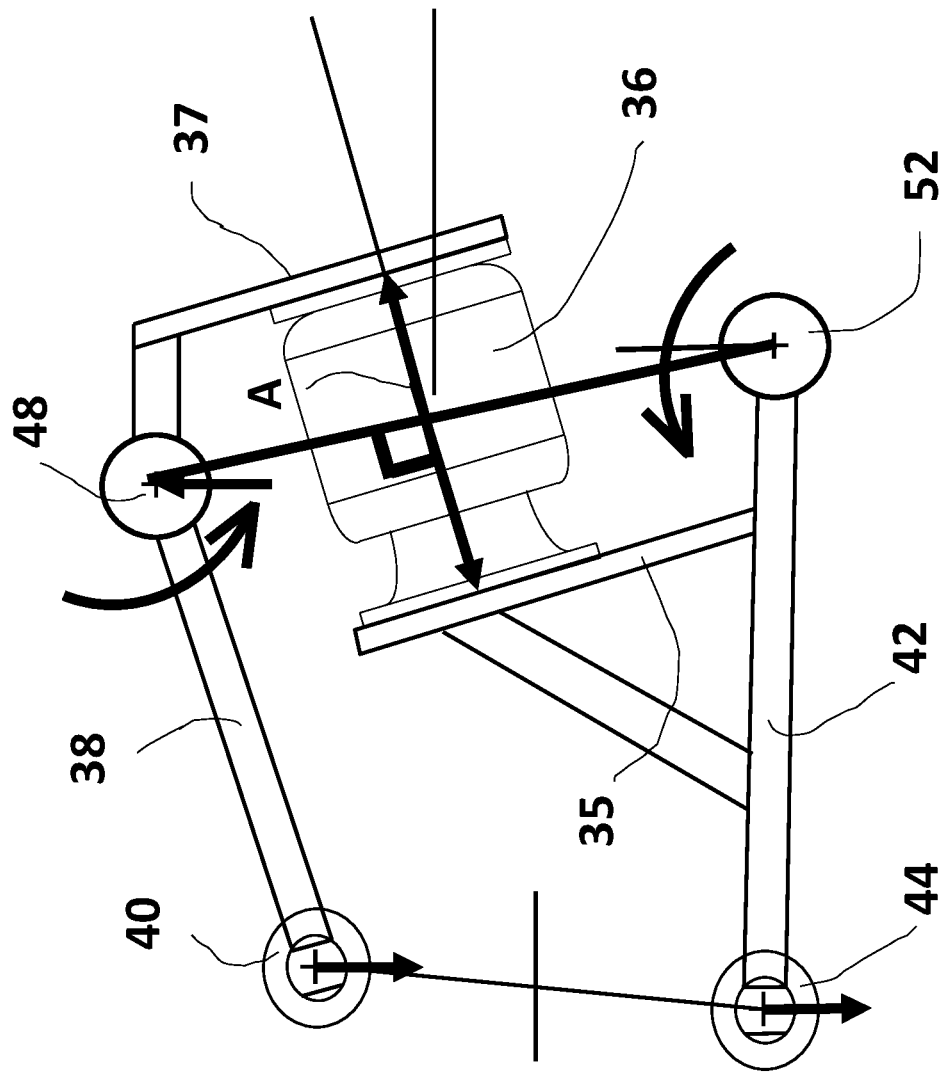
FIG. 17 provides a schematic view of the interaction of an air spring with elements of a suspension system in accordance with this invention.
Figure 21:
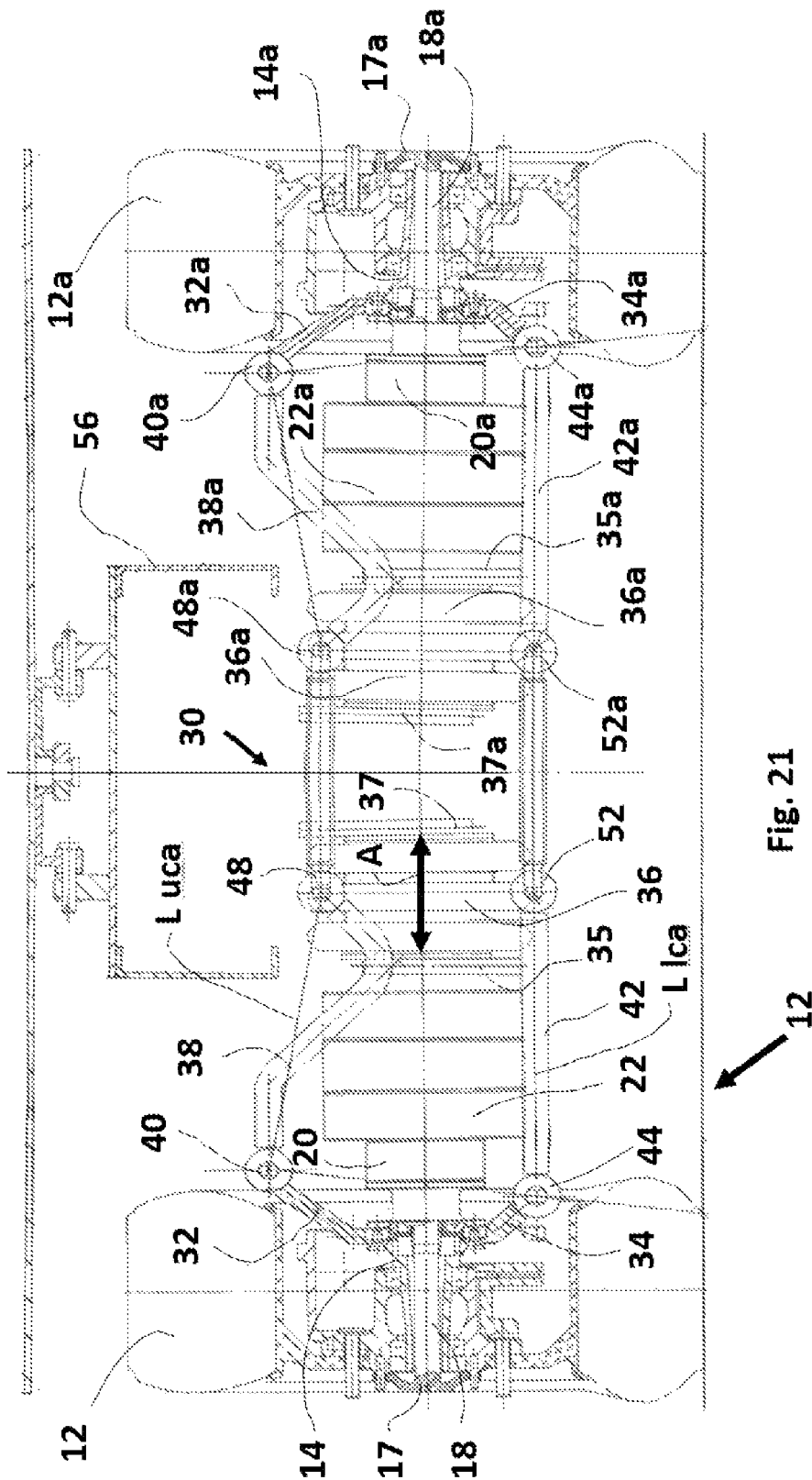
FIG. 21 is a cross-sectional view of a suspension system in accordance with this invention shown on a single wheel truck.
Figure 22A:
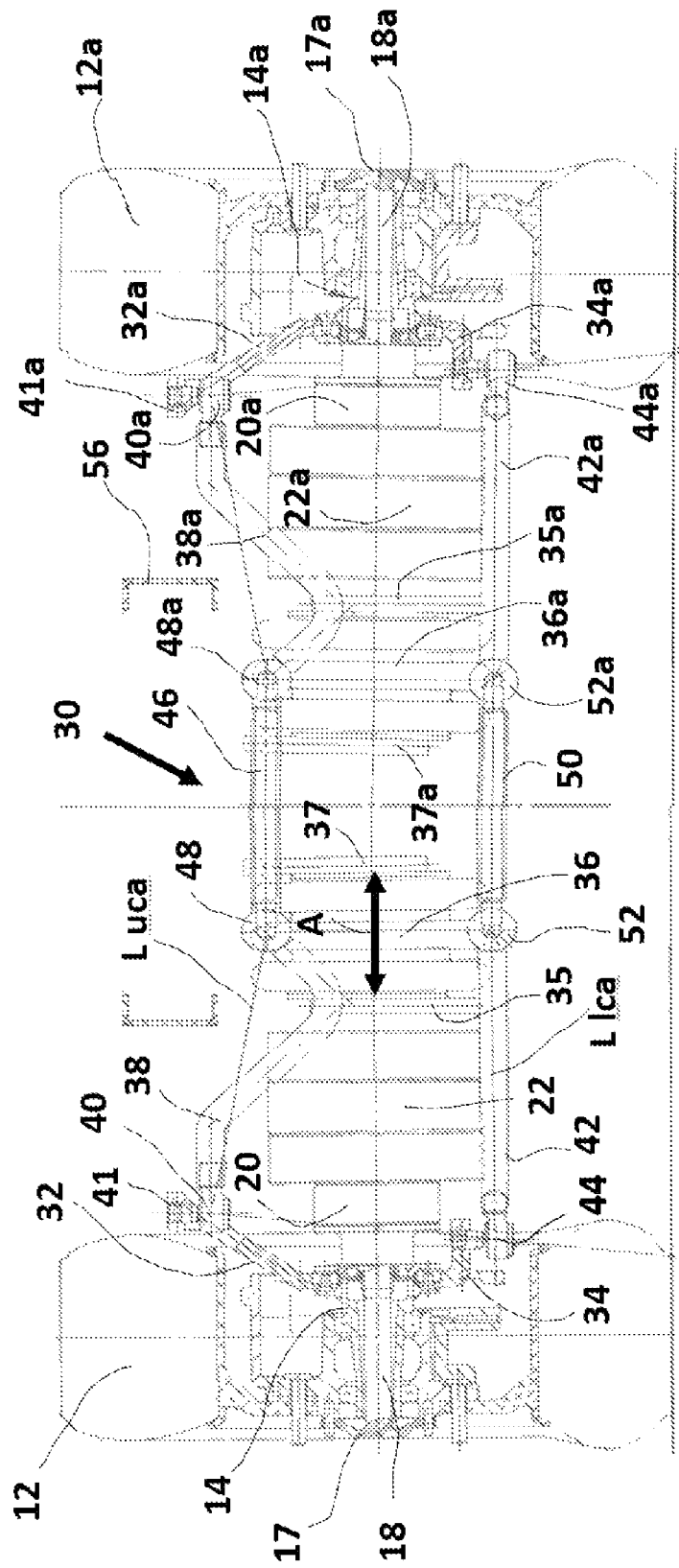
FIG. 22A is a cross-sectional view of a suspension system in accordance with this invention shown on a single wheel truck as a front axle.
Figure 26:
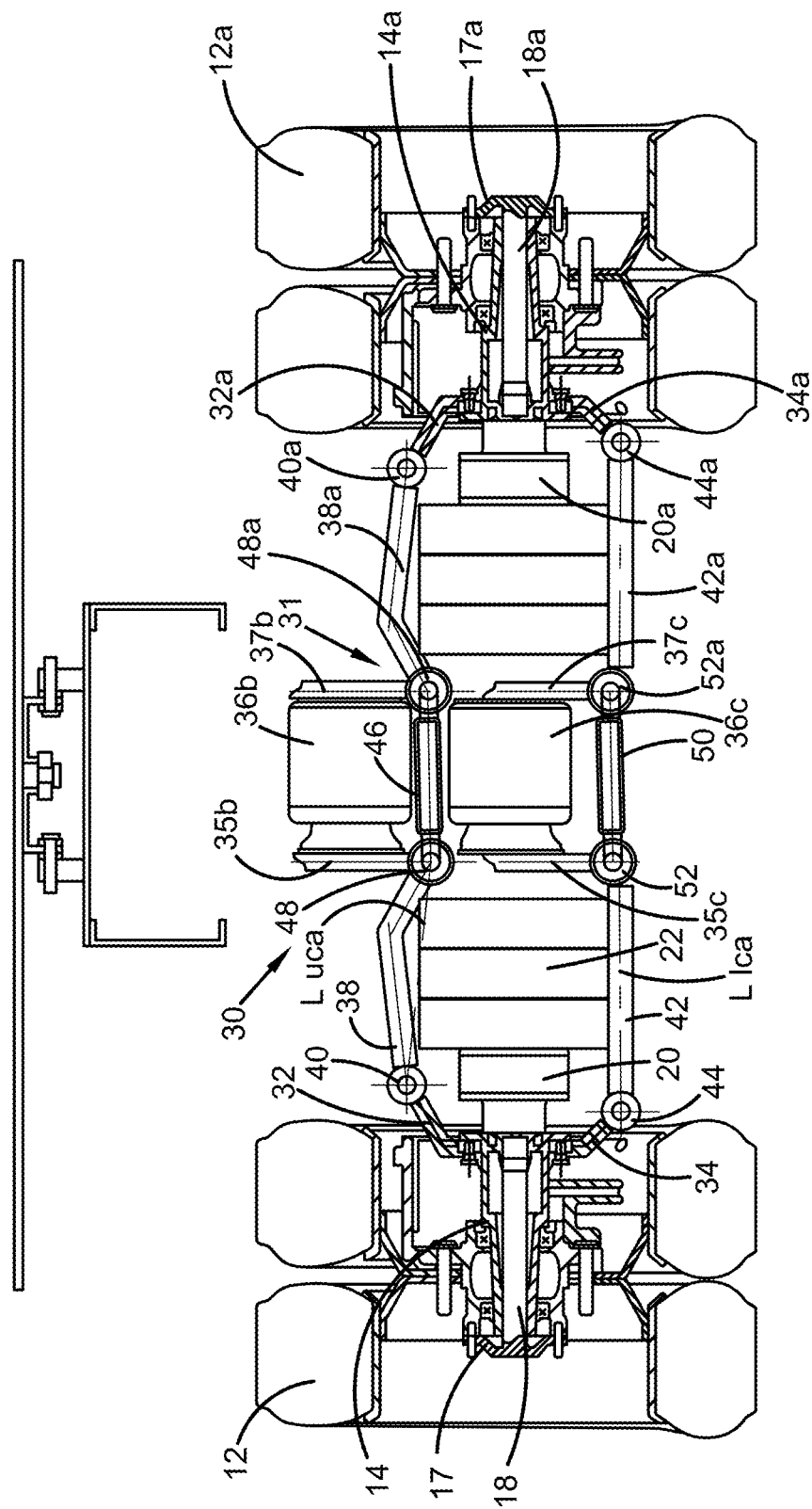
FIG. 26 is a cross-sectional view of a suspension system in accordance with this invention shown on a dual wheel tractor.

Referring now to FIG. 16, a suspension system 30 of a single wheel trailer 10 includes an upper mounting bracket 32 extending from the stub-axle spindle 14, and a lower mounting bracket 34 extending from the stub-axle spindle 14, such that the two brackets 32, 34 provide separation between the other elements of the suspension system 30, and, in the practice of the power conversion concepts first disclosed above, provide space for power conversion components, as seen at axle shaft 18, step-up drive 20, and power conversion unit 22 of FIG. 16, which occupy space that would normally be occupied by a tubular axle. This is also the case in FIGS. 23 (with a steerable single wheel trailer 10) and 24 (with a dual wheel trailer 10). In FIGS. 21, 22, and 26, axle shaft 18, step-up drive 20, and power conversion unit 22 occupy space that would normally be occupied by a drive axle, with FIG. 21 showing a truck 10 with a single wheel drive axle wheel end installation, FIG. 22A showing a truck 10 with a single wheel drive/steer axle wheel end installation as a front axle, FIG. 22B showing a truck 10 with a single wheel drive axle wheel end installation as a rear drive axle, and FIG. 26 showing a truck 10 with a dual wheel drive axle wheel end installation as a rear drive axle. These are examples and the present invention is not limited to or by any particular installation environment.

Turning again to FIG. 16, the suspension system 30 further comprises an air spring 36 having a direction of expansion and contraction (see arrow A), the air spring 36 being mounted such that the direction of expansion and contraction is off of vertical, or off of perpendicular to the ground (relative to use in a truck/trailer). It will be appreciated that current state of the art is to mount air springs vertically. In some embodiments, such as those particularly exemplified in FIGS. 16, 21, 22, 23, 24, and 26, the air spring 36 can be mounted such that the direction of expansion and contraction is horizontal. In such embodiments, the air spring would be mounted rotated 90 degrees offset from its typical orientation. In some embodiments, the direction of expansion and contraction would be at an angle beta (B) of from 0 or more to less than 90, in some embodiments, from 0 or more to less than 85, and in some embodiments, from 0 or more to less than 80.

An upper control arm 38 is pivotally secured to the upper mounting bracket 32 to pivot about an upper control arm pivot point 40, and a lower control arm 42 is pivotally secured to the lower mounting bracket 34 to pivot about a lower control arm pivot point 44. An upper frame mounting structure 46 mounts the suspension system 30 to the truck (FIGS. 21, 22, 26) or trailer (FIGS. 16, 23, 24), the upper control arm 38 being pivotally secured to the upper frame mounting structure 46 at the upper control arm pivot point 48. The pivot point 48 is inboard of the pivot point 40, and the pivot point 52 is inboard of pivot point 44. A lower frame mounting structure 50 mounts the suspension system 30 to the truck or trailer, the lower control arm 42 being pivotally secured to the lower frame mounting structure 50 at a lower frame mounting structure pivot point 52.

Figure 23:
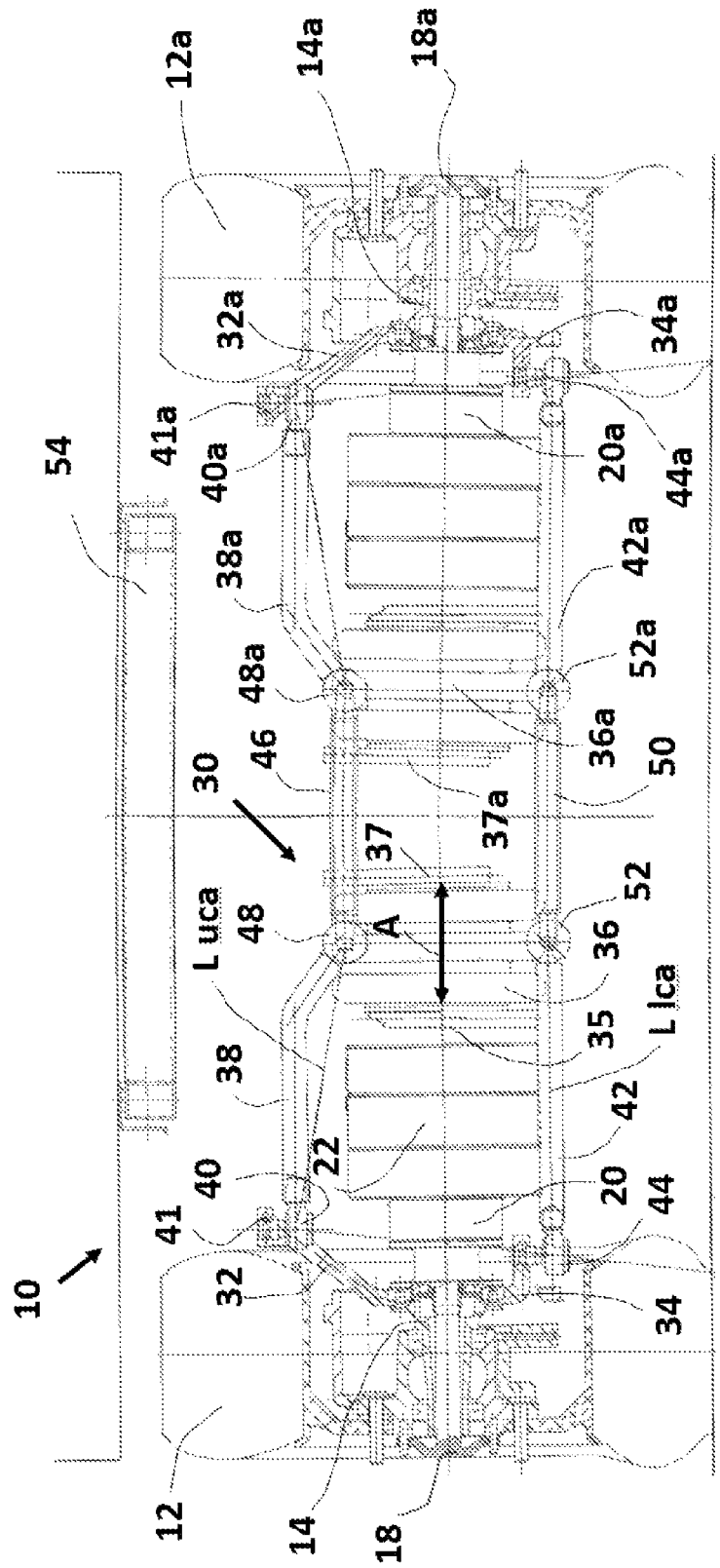
FIG. 23 is a cross-sectional view of a suspension system in accordance with this invention, providing a trailer with a steerable wheel.
Figure 24:
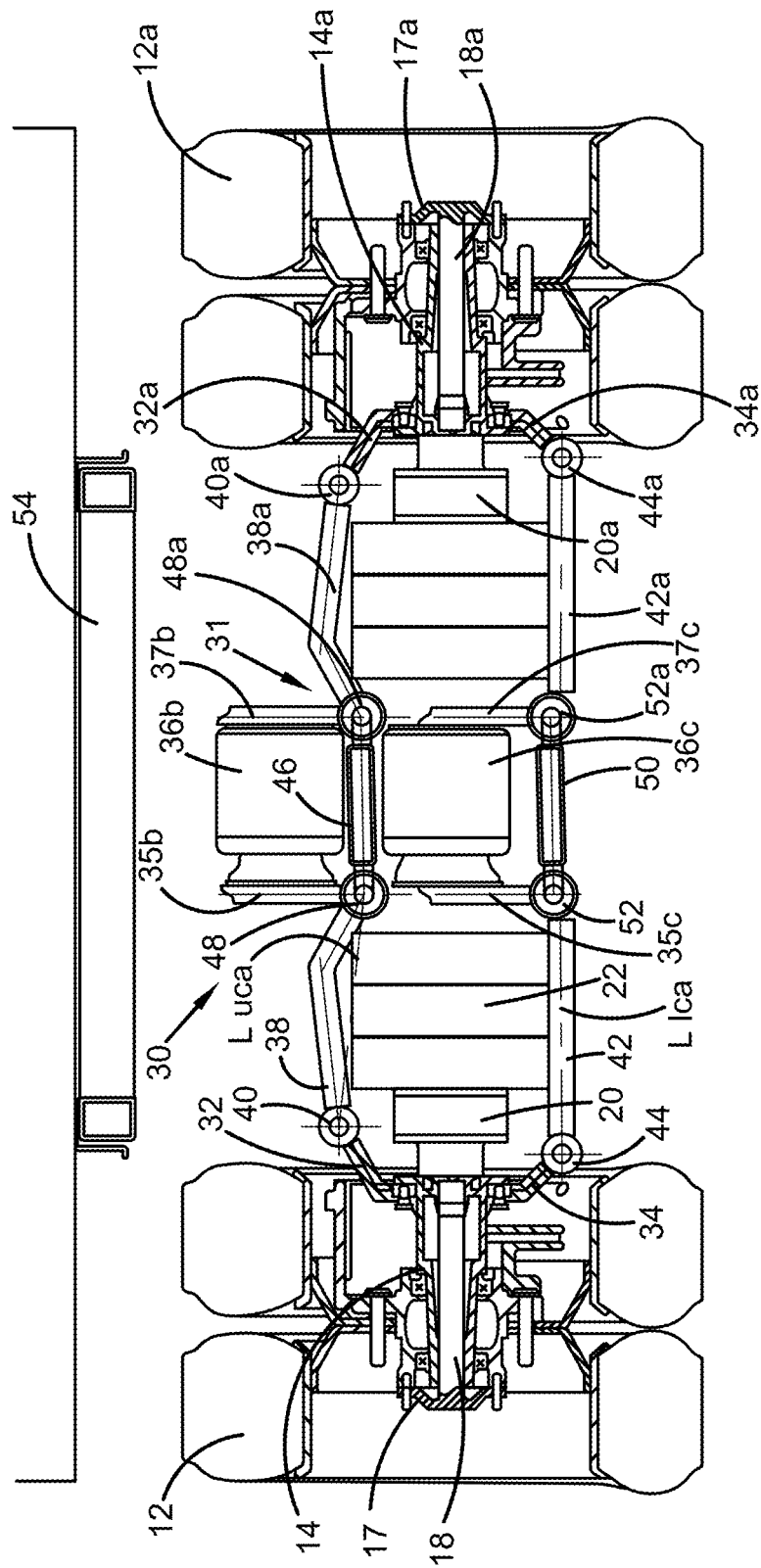
FIG. 24 is a cross-sectional view of a suspension system in accordance with this invention shown on a dual wheel trailer.

In some trailer embodiments, the suspension system 30 can be mounted to the movable slider box 54, as shown at FIGS. 16, 23, 24 and in some truck embodiments, the suspension system 30 can be mounted to the frame rails 56 of a truck, as shown at FIGS. 21, 22, 26. In some embodiments, the upper frame mounting structure 46 and lower frame mounting structure 50 can be a unitary structure or joined together as a with many suspension mounts used in trucks and trailers.

In some embodiments, one or more of the upper control arm pivot point 40 and lower control arm pivot point 44 are defined by a connection such as straddle pin bushings, standard bushings and the like between the upper support bracket 32 and upper control arm 38, for pivot point 40, and between the lower support bracket 34 and lower control arm 42, for pivot point 44. In some embodiments, one or more of the upper frame mounting structure pivot point 48 and lower frame mounting structure pivot point 52 are defined by a connection such as straddle pin bushings, standard bushings and the like between the upper control arm 38 and the upper frame mounting structure 46, for pivot point 48, and between the lower control arm 42 and the lower from mounting structure 50, for pivot point 52.

In some embodiments, the direction of expansion and contraction of the air spring 36 is perpendicular to a line between the upper frame mounting structure pivot point 48 and the lower frame mounting structure pivot point 52. It is not necessary that the orientation of the air spring be perpendicular to maintain the effectiveness of the air spring, though placement is advantageous to take full advantage of a perpendicular force vector from the air spring. Despite the particular orientation, it is desirable to maintain the upper to lower air spring arm ratio to equalize forces at the control arm pivot points. In FIGS. 16, 21, 22, 23, 24, and 26, the line of expansion and contraction is horizontal and the line between pivot points 48 and 52 is vertical. As seen in FIGS. 17-20, this allows for a selection of locations for the air spring 36, and the same applies to the structures of FIGS. 16, 21, 22, 23, 24, and 26. The ability to place the air spring 36 at different angles off of the typical vertical also allows for alternative suspension system structures for various trucks and trailers.

In the embodiments of FIGS. 16, 21, 22, and 23, a left-right suspension system 30 is provided, with air springs 36 and 36a acting at opposed wheels 12, 12a, though also acting in concert to lift the upper and lower frame mounting structures to which they connect and with which they interact. Broadly, only the action at wheel 12 is first addressed, with reference particularly to the schematics of FIGS. 17 and 20. The air spring 36 is mounted between a lower control arm spring support plate 35 rigidly secured to the lower control arm 42 such that forces on the support plate 35 from air spring 36 are transferred to the lower control arm 42, and an upper control arm spring support plate 37 rigidly secured to the upper control arm 38 such that forces on the support plate 37 from air spring 36 are transferred to the upper control arm 38. Expansion of the air spring 36 pushes against said lower control arm spring support plate 35 and the upper control arm spring support plate 37 resulting in a lifting of the upper frame mounting structure 46 relative to the upper control arm pivot point 40 and a lifting of the lower frame mounting structure 50 relative to the lower control arm pivot point 44. Contraction results in lowering. This can be generally appreciated in comparison of FIGS. 17 and 20, and consideration of the moment arms resultant in the structure shown and described.

Figure 27:
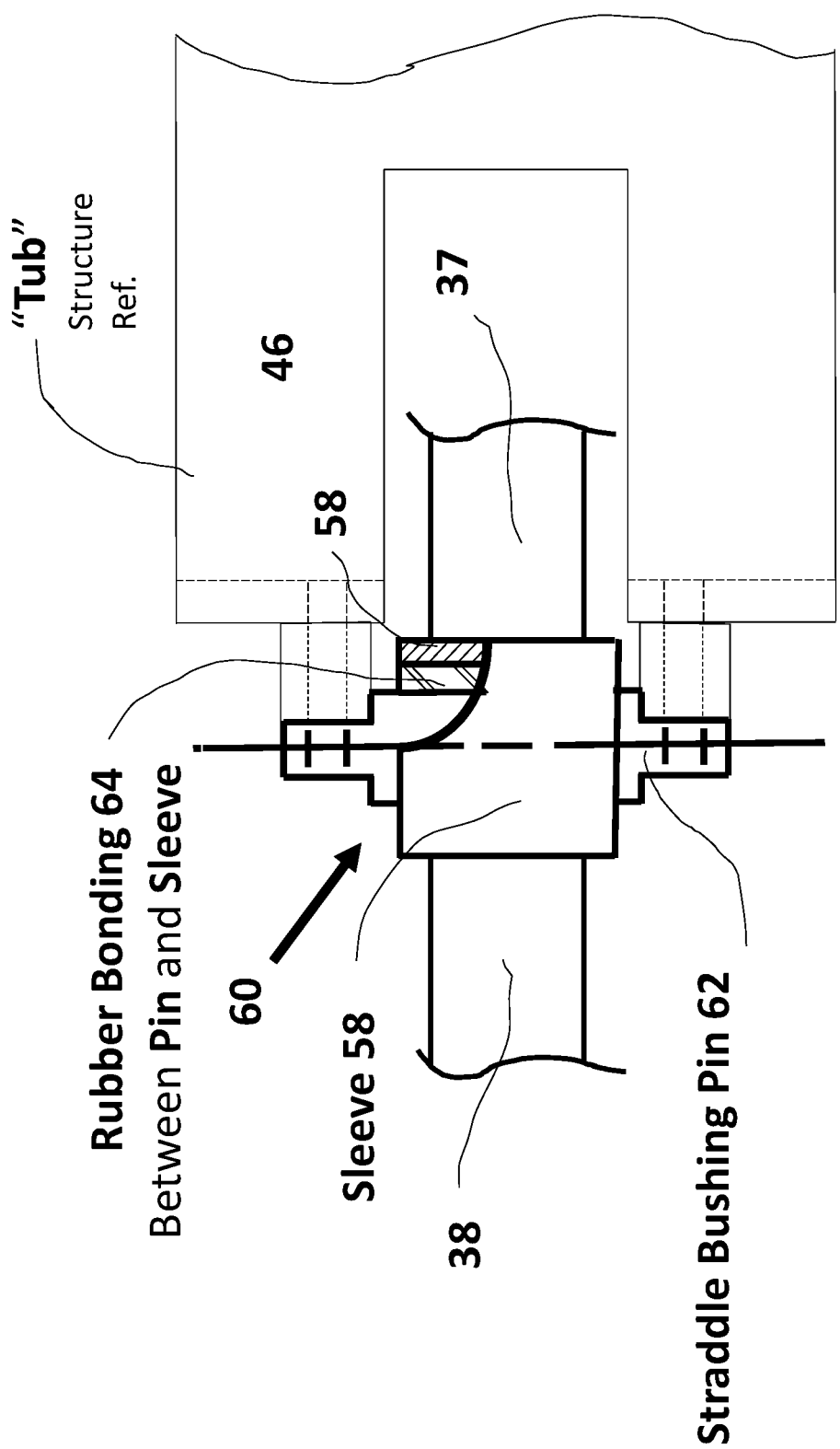
FIG. 27 is a top view of an example connection between the upper frame mounting structure and the control arm of the suspension system.

An exemplary manner in which to provide pivot point 48 is shown in FIG. 27, with the understand that those of ordinary skill in the art will be familiar and capable of adapting other structures to provide the lifting of the frame mounting structures 46, 50, (and the opposed structures at the opposite wheel end) upon expansion of the air spring 36 and the action on associated spring plates and control arms. FIG. 27 looks downwardly on the upper control arm 38 and upper spring plate 37 connected to each other by a sleeve 58 of a straddle pin bushing 60. The straddle pin bushing 60 provides a straddle pin 62, and relative rotation is permitted between the straddle pin 62 and the sleeve 58. A rubber bonding 64 between pin 62 and sleeve 58 can permit such movement. The straddle bushing pin 62 is secured to the upper frame mounting structure 46, thus allowing the frame mounting structure to translate upwards and downward while the sleeve 58 rotates relative to the pin 62 during movement such as that exemplified in FIGS. 17 and 20.

A drive/steerable tractor front axle of FIG. 22A employs ball joints as the upper and lower control arm pivot points 40, 40a, 44, 44a, with steering knuckle 41 and opposed steering knuckle 41a communicating with respective ball joints as shown. This notably allows for a 6×4 or a 6×6 wheel position e-truck/tractor configuration of the present invention. A steerable trailer of FIG. 23, employs ball joints as the upper and lower control arm pivot points 40, 40a, 44, 44a, with steering knuckle 41 and opposed steering knuckle 41a communicating with respective ball joints as shown. This notably allows for a trailer capable of maneuvering in confined spaces.

As seen, in some embodiments, the suspension structures are repeated at the wheel at the other side of the truck or trailer, with opposed stub axle spindle 14a, opposed upper mounting bracket 32a, opposed lower mounting bracket 34a, opposed upper control arm 38a, and opposed lower control arm 42a, etc., with all like parts receiving like numerals but with the addition of "a". The air spring 36 acts at the left between plate 35 and 37, while the air spring 36a acts at the right between plate 35a and 37a. They work in tandem to lift and lower the truck/trailer and also provide room for the axle shafts driving the step-up drive ratio units. Exact symmetry of each opposed element is not required and the invention expressly allows for variations of shape or size of various components as needed to fit within a given truck/trailer. In some embodiments, there will be such symmetry.

In the embodiments of FIGS. 24 and 26, an upper-lower suspension system 30 is provided with an upper air spring 36b acting at opposed wheels 12, 12a, to lift the upper frame mounting structure 46, and a lower air spring 36c acting at opposed wheels 12, 12a, to lift the lower frame mounting structure 50, though these upper and lower portions also act in concert. An opposed wheel 12a forms a wheel pair (12/12a) with the wheel 12, with an opposed upper mounting bracket 32a extending from an opposed stub-axle spindle 14a, and an opposed lower mounting bracket 34a extending from the opposed stub-axle spindle 14a. An opposed upper control arm 38a is pivotally secured to the opposed upper mounting bracket 32a to pivot about an opposed upper control arm pivot point 40a. An opposed lower control arm 42a is pivotally secured to the lower mounting bracket 34a to pivot about a lower control arm pivot point 44a. The opposed upper control arm 38a is pivotally secured to the upper frame mounting structure 46 at an opposed upper frame mounting structure pivot point 48a, and the opposed lower control arm 42a is pivotally secured to the lower frame mounting structure 50 at an opposed lower frame mounting structure pivot point 52a.

Figure 25:
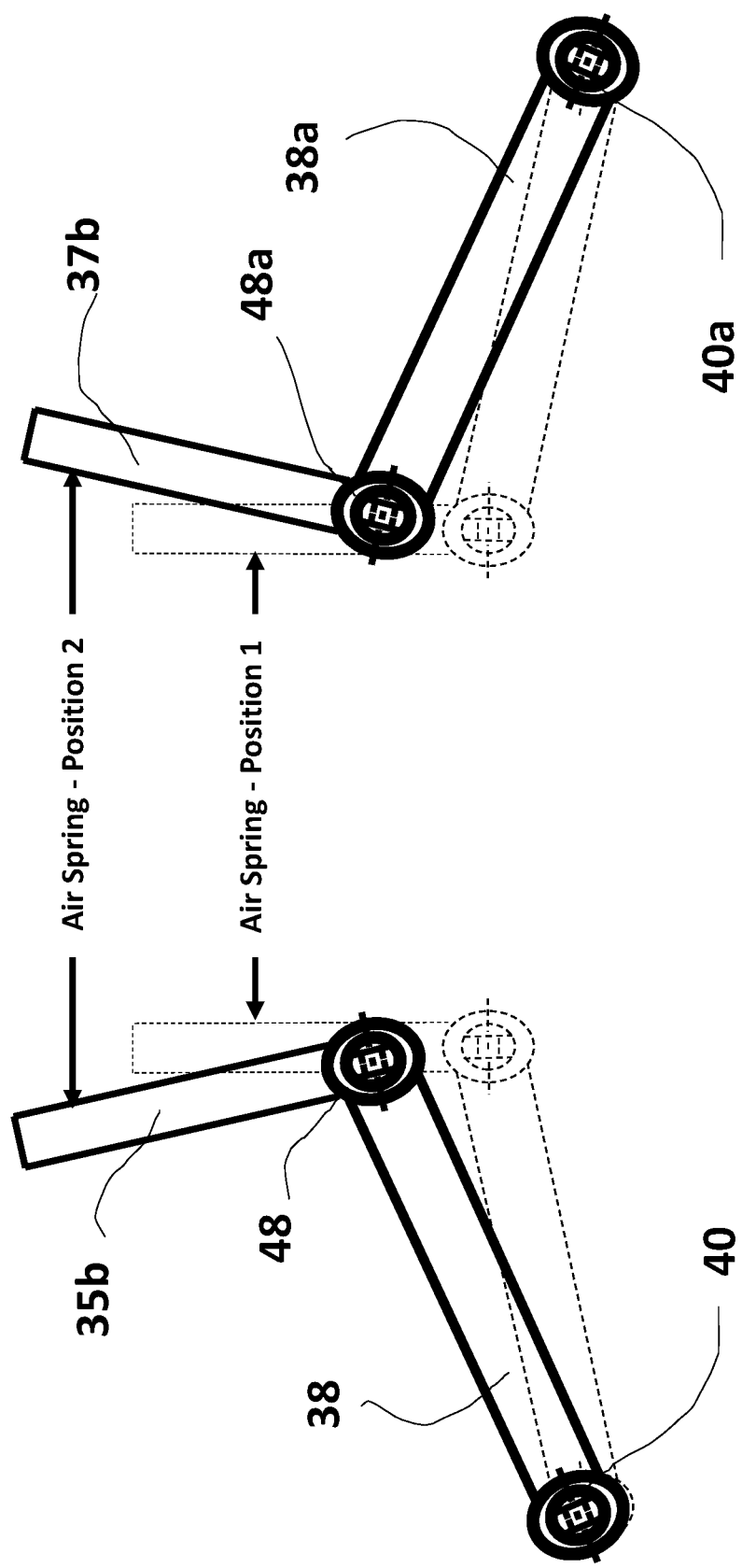
FIG. 25 is a schematic showing movement of the suspension system upon expansion of the air spring, as particularly compared to the systems of FIGS. 24 and 26.

The embodiments of FIGS. 24-26 include an upper air spring 36b mounted between an upper control arm spring support plate 35b rigidly secured to the upper control arm 38 such that forces on the support plate 35b from air spring 36b are transferred to the upper control arm 38, and an opposed upper control arm spring support plate 37b rigidly secured to the opposed upper control arm 38a such that forces on the support plate 37b from air spring 36b are transferred to the opposed upper control arm 38a. Expansion of the upper air spring 36b pushes against the upper control arm spring support plate 35b and the opposed upper control arm spring support plate 37b resulting in a lifting of the upper frame mounting structure 46, upward relative to pivot points 40 and 40a. Contraction results in lowering. This can be generally appreciated in comparison of FIGS. 24-25, and consideration of the moment arms resultant in the structure shown and described.

Similarly, the lower air spring 36c is mounted between a lower control arm spring support plate 35c rigidly secured to the lower control arm 42 such that forces on the support plate 35c from air spring 36c are transferred to the lower control arm 42, and an opposed lower control arm spring support plate 37c rigidly secured to the opposed lower control arm 42a such that expansion of the lower air spring 36c pushes against the lower control arm spring support plate 35c and the opposed lower control arm spring support plate 37c resulting in a lifting of the lower frame mounting structure 50.

In some embodiments, the positional mounting of the air spring is mathematically related to the proportion between said upper and said lower control arms to act equally on the upper and the lower control arms producing vertical forces on said pivot pins to carry the trailer/truck load.

In some embodiments, the air spring 36 is mounted perpendicular to a line between the upper and the lower pivot points and located laterally between them proportional to a length ratio calculation of the control arm lengths in order to provide equal downward forces on the upper and lower control arm pivot points 40, 44. To accomplish this, the sum of the moments about each pivot point must be calculated. There are two moments about the upper pivot point 40. The first one is M upp, the product of the force at the upper control arm pivot point 40, F upp, times the distance between the upper control arm pivot point 40 and the upper frame mounting structure pivot point 48, L uca (the "length" of the upper control arm):

$$M\ upp = F\ upp \times L\ uca \quad (1).$$

Similarly, the moment about the lower pivot point 44, M lpp, is the product of the force on the lower control arm pivot point 44, F lpp, times the distance between the lower control arm pivot point 44 and the lower from mounting structure pivot point 52, L lca (the "length" of the lower control arm):

$$M\ lpp = F\ lpp \times L\ lca \quad (2).$$

Equating equations (1) and (2), for the force on the pivot points 40, 44 to be equal, $$F\ upp = M\ upp/L\ uca \text{ and } F\ lpp = M\ lpp/L\ lca$$

Therefore, $$M\ upp/M\ lpp = Luca/L\ lca \qquad (3).$$

The other moment, M upp, is the force available from the air spring 36 times the length of the upper air spring arm, L usa, which is the length of the line from the upper frame mounting pivot point 48 to the intersection with the line drawn through the center of the air spring 36 in the direction of expansion and contraction of the air spring 36 (see arrow A). L usa is the length of the moment arm relative to the pivot point 48 through which it acts:

$$M\ uca = F\ as \times L\ usa \qquad (4).$$

The other moment, M lca, is the force available from the air spring 36 times the length of the lower air spring arm, L lsa, which is the length of the line from the lower frame mounting pivot point 52 to the intersection with the line drawn through the center of the air spring 36 in the direction of expansion and contraction of the air spring 36 (see arrow A). L lsa is the length of the moment arm relative to the pivot point 52 through which it acts:

$$M\ lca = F\ as \times L\ lsa \qquad (5).$$

Equating equations (4) and (5), for the force from the air spring to be equal, $$F\ as = M\ uca/L\ usa \text{ and } F\ as = M\ lca/L\ lsa$$

Therefore, $$M\ uca/M\ lca = L\ usa/L\ lsa \qquad (6).$$

Now, equating equations (3) and (6), $$M\ upp/M\ lpp = Luca/L\ lca$$

$$M\ uca/M\ lca = L\ usa/L\ lsa$$

$$L\ usa/L\ lsa = Luca/L\ lca$$

$$L\ usa = (L\ uca/L\ lca) \times L\ lsa \qquad (7).$$

Also, the length of the air spring arm is equal to the sum of the upper air spring arm plus the length of the lower air spring arm.

$$Lsa = L\ usa + L\ lsa,$$

thus, $$L\ lsa = Lsa - L\ usa \qquad (8).$$

Substituting (8) into (7), $$L\ usa = (L\ uca/L\ lca) \times (Lsa - L\ usa)$$

$$L\ usa = (L\ uca/L\ lca) \times Lsa - (L\ uca/L\ lca) \times L\ usa$$

$$L\ usa + (L\ uca/L\ lca) \times L\ usa = (Luca/L\ lca) \times Lsa$$

$$L\ usa \times (1 + (L\ uca/L\ lca)) = (Luca/L\ lca) \times Lsa$$

$$L\ usa = ((L\ uca/L\ lca)/(1 + (L\ uca/L\ lca))) \times Lsa$$

$$L\ usa = ((L\ uca/L\ lca)/((L\ lca + Luca)/L\ lca)) \times Lsa$$

$$L\ usa = ((L\ uca/L\ lca) \times L\ lca)/(L\ uca + L\ lca) \times Lsa$$

Finally, $$L\ usa = (L\ uca/(L\ uca + L\ lca)) \times Lsa \qquad (9)$$

and, $$L\ lsa = (L\ lca/(L\ uca + L\ lca)) \times Lsa \qquad (10).$$

Figure 19:
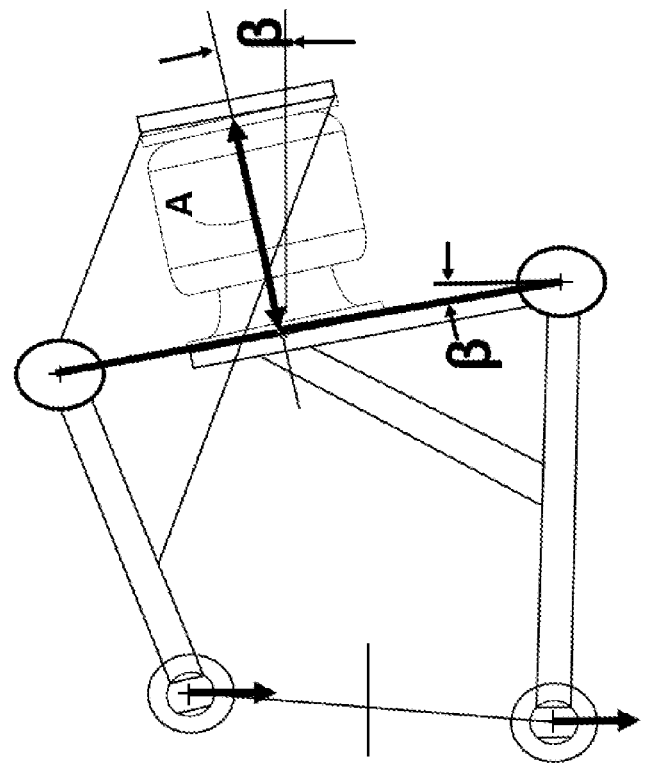
FIG. 19 provides a schematic view of the interaction of an air spring with elements of a suspension system in accordance with this invention, showing the versatility of air spring positioning.
Figure 18:
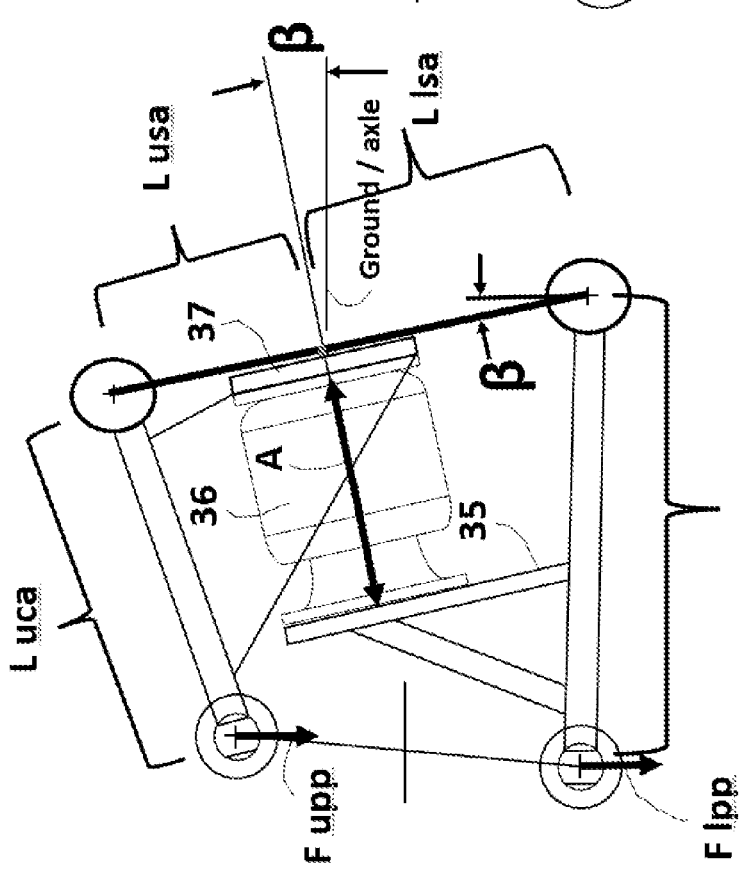
FIG. 18 provides a schematic view as in FIG. 17, showing lever arm lengths of and forces on components.
Figure 20:
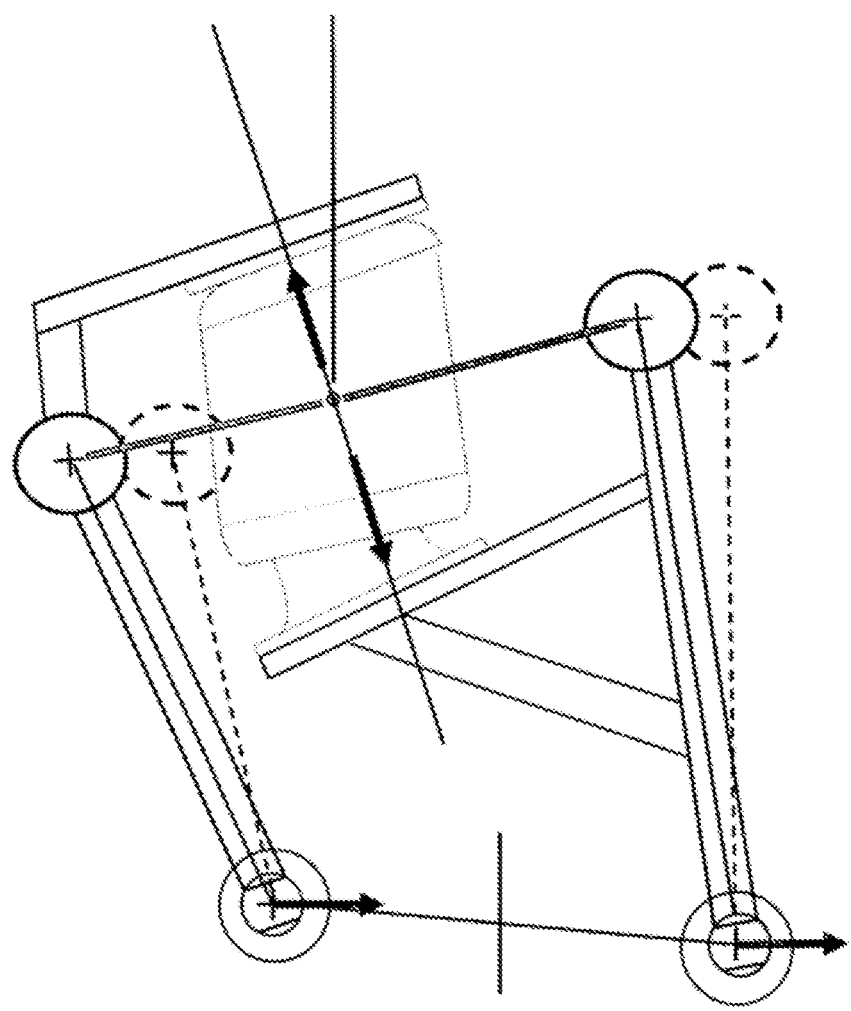
FIG. 20 shows movement of the suspension system upon expansion of the air spring, as particularly compared to the schematic representation of FIG. 17.

Equations (9) and (10) establish the proportioning of the upper and lower air spring arm lengths. Notably, though FIGS. 16, 21-24, and 26 show upper control arms 38, 38a being bent, the length of the control arm for such equations is the distance between the pivot points 40, 48. The inboard-outboard location of the air spring center can be located at any desired appropriate position to allow for packaging considerations without affecting the design performance. FIGS. 18, 19.

Figure 2:
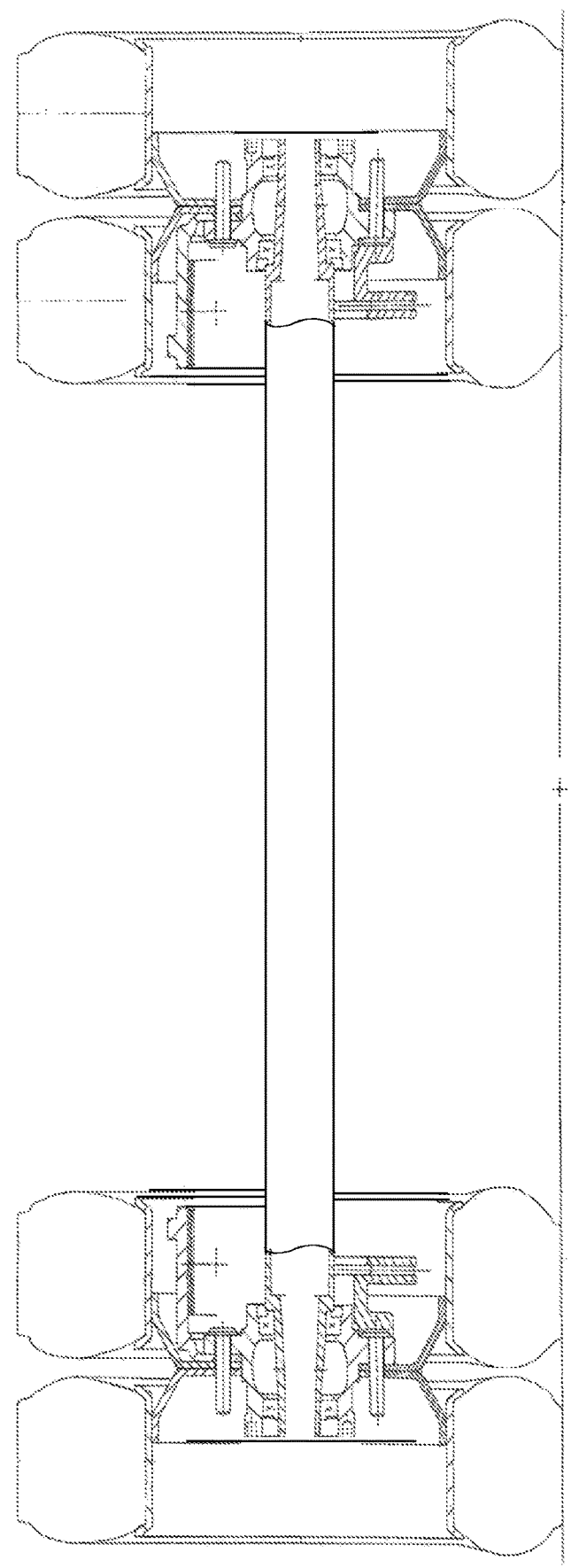
FIG. 2 is a general cross-sectional view of a standard tubular axle of the prior art.
Figure 28:
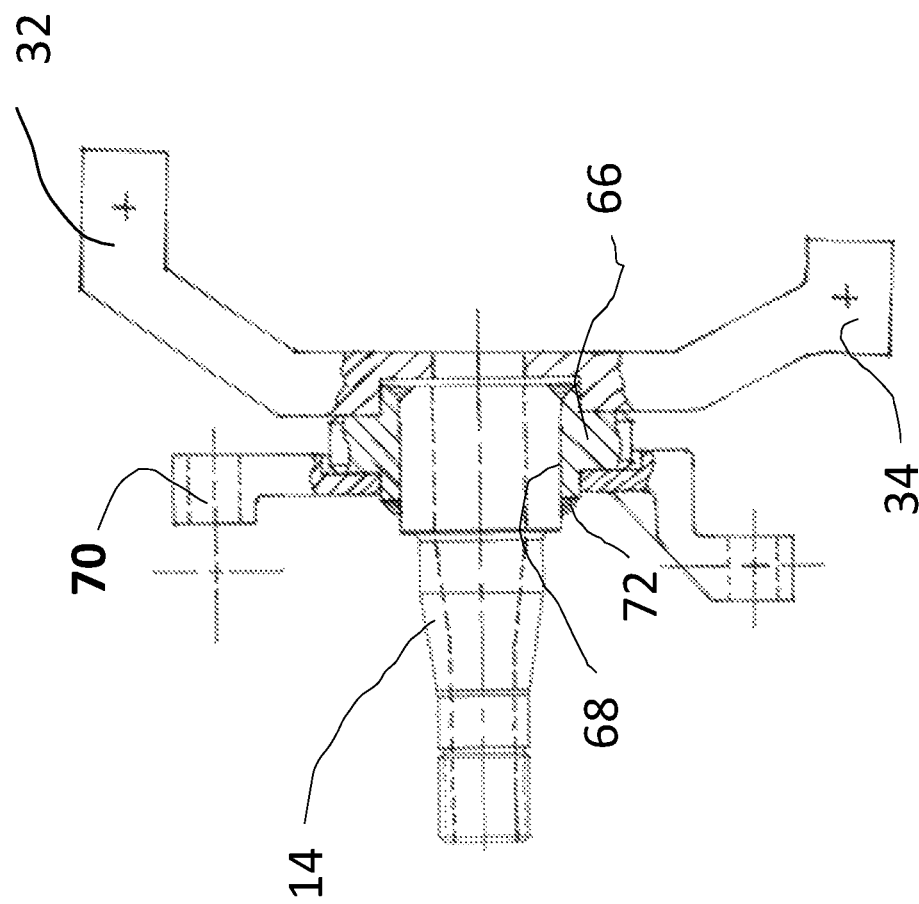
FIG. 28 shows mounting brackets and a drum brake bracket mounted to a stub axle spindle.

As seen in FIGS. 4, 28, and 29, in some embodiments, the stub axle spindle 14 provides at least upper and lower flanges for mounting upper and lower mounting bracket. As seen in FIGS. 2 and 28, the stub axle spindle includes a flange disc 66, with a through bore 68 to accept the axle shaft fitting at the inboard end of the stub axle spindle, and, as can be seen in FIG. 28 and elsewhere, the flanged disc 66 provides structure to mount the upper and lower mounting brackets 32, 34. It is possible for these to be separate parts, but as shown in FIG. 28 are one component, like the drum brake bracket 70. The flanged disc 66 can also receive other elements such as a drum brake bracket 70 (FIG. 28, 29). In some embodiments, the stub axle spindle 14 and the flanged disc 66 are welded together, as at welds 72, FIG. 4. This configuration permits easy adjustment of the dimension needed to package different tire and wheel combinations during prototyping and early production. In other embodiments, the stub axle spindle 14 and flange disc 66 can be a one-piece forged structure, machined after forging. This configuration affords cost reduction benefits and weight reduction considerations. In some embodiments, as shown in FIG. 29, a brake drum bracket 70 and the upper and lower mounting brackets 32, 34, can be formed unitary with the stub axle spindle, comprising what is termed an "integrated knuckle" in the industry. This configuration permits the ultimate cost reduction benefits and weight reduction considerations.

PARTS LIST

- 10 truck or trailer
- 12 wheel
- 14 stub axle spindle
- 14a opposed stub axle spindle
- 16 through bore (of stub axle spindle)
- 17 head portion (of axle shaft)
- 17a opposed head portion
- 18 axle shaft
- 18a opposed axle shaft
- 19 inboard end (of axle shaft)
- 20 step-up drive ratio unit
- 20a opposed step-up drive ratio unit
- 22 power conversion unit
- 22a opposed power conversion unit
- 23 second power conversion unit
- 24 battery
- 26 hub
- 28 splined receipt
- 30 suspension system
- 32 upper mounting bracket
- 32a opposed upper mounting bracket
- 34 lower mounting bracket
- 34a opposed lower mounting bracket
- 36 air spring
- 35 lower control arm spring support plate 37 upper control arm spring support plate
36a opposed air spring
35a opposed lower control arm spring support plate
37a opposed upper control arm spring support plate
36b upper air spring
35b upper control arm spring support plate
37b opposed upper control arm spring support plate
36c lower air spring
35c lower control arm spring support plate
37c opposed lower control arm spring support plate
38 upper control arm
38a opposed upper control arm
40 upper control arm pivot point
40a opposed upper control arm pivot point
41 steering knuckle
41a opposed steering knuckle
42 lower control arm
42a opposed lower control arm
44 lower control arm pivot point
44a lower control arm pivot point
46 upper frame mounting structure
46a opposed upper frame mounting structure
48 upper frame mounting structure pivot point
48a opposed upper frame mounting structure pivot point
50 lower frame mounting structure
52 lower frame mounting structure pivot point
52a opposed lower frame mounting structure pivot point
54 slider box
56 frame rails
58 sleeve
60 straddle pin bushing
62 straddle pin
64 rubber bonding
66 flange disc
68 though bore
70 drum brake bracket
72 welds While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A truck or trailer comprising:
  a wheel end installation including:
    a wheel,
    a stub axle spindle extending through the wheel and having a through bore,
    a step-up drive ratio unit inboard of said stub-axle spindle,
    an axle shaft extending through the through bore of the stub-axle spindle and operatively connected to the step-up drive ratio unit, the axle shaft rotating with the wheel,
    a power conversion unit operatively connected to the step-up drive ratio unit, such that mechanical energy from rotation of the axle shaft is converted, through the step-up drive ratio unit and the power conversion unit, into electrical energy, wherein the wheel of the wheel end installation is either a right wheel or a left wheel of a wheel pair of the truck or trailer, wherein the right wheel and left wheel are not joined by a tubular axle or drive axle, and wherein the step-up drive ratio unit and power conversion unit occupy a space that would be occupied by a tubular axle or drive axle, if the tubular axle joined the wheel pair.

2. The truck or trailer of claim 1, further comprising a battery for storing the electrical energy.

3. The truck or trailer of claim 2, wherein the power conversion unit is selected from a generator and a motor-generator.

4. The truck or trailer of claim 3, wherein the power conversion unit is the motor-generator also converting electrical energy to mechanical energy for rotation of the axle shaft.

5. The truck or trailer of claim 1, wherein the axle shaft is connected to a hub of the wheel at an outboard end thereof.

6. The truck or trailer of claim 4, further comprising a second motor-generator operatively connected to the step-up drive ratio unit.

7. The truck or trailer of claim 1, wherein the axle shaft is operatively connected to the step-up drive ratio unit by being keyed thereto.

8. The truck or trailer of claim 1, further comprising a suspension system comprising:
  an upper mounting bracket extending from the stub-axle spindle;
  a lower mounting bracket extending from the stub-axle spindle, wherein the suspension system provides room for the axle shaft and step-up ratio drive unit.

9. The truck or trailer of claim 8, wherein the suspension system further comprises an air spring having a direction of expansion and contraction, the air spring being mounted such that the direction of expansion and contraction is off of vertical.

10. The truck or trailer of claim 9, wherein the suspension system further comprises:
  an upper control arm pivotally secured to the upper mounting bracket to pivot about an upper control arm pivot point;
  a lower control arm pivotally secured to the lower mounting bracket to pivot about a lower control arm pivot point;
  an upper frame mounting structure mounting the suspension system to the truck or trailer, the upper control arm being pivotally secured to the upper frame mounting structure at an upper frame mounting structure pivot point;
  a lower frame mounting structure mounting the suspension system to the truck or trailer, the lower control arm being pivotally secured to the lower frame mounting structure at a lower frame mounting structure pivot point.

11. A truck or trailer comprising:
  a wheel,
  a stub axle spindle extending through the wheel and having a through bore,
  a step-up drive ratio unit inboard of said stub-axle spindle,
  an axle shaft extending through the through bore of the stub-axle spindle and operatively connected to the step-up drive ratio unit, the axle shaft rotating with the wheel,
  a power conversion unit operatively connected to the step-up drive ratio unit, such that mechanical energy from rotation of the axle shaft is converted, through the step-up drive ratio unit and the power conversion unit, into electrical energy,
  a suspension system comprising:
    an upper mounting bracket extending from the stub-axle spindle;

a lower mounting bracket extending from the stub-axle spindle, wherein the suspension system provides room for the axle shaft and step-up drive ratio unit an upper control arm pivotally secured to the upper mounting bracket to pivot about an upper control arm pivot point;

a lower control arm pivotally secured to the lower mounting bracket to pivot about a lower control arm pivot point;

an upper frame mounting structure mounting the suspension system to the truck or trailer, the upper control arm being pivotally secured to the upper frame mounting structure at an upper frame mounting structure pivot point;

a lower frame mounting structure mounting the suspension system to the truck or trailer, the lower control arm being pivotally secured to the lower frame mounting structure at a lower frame mounting structure pivot point, an air spring having a direction of expansion and contraction, the air spring being mounted such that the direction of expansion and contraction is off of vertical, wherein the air spring is mounted between:
a lower control arm spring support plate secured to the lower control arm, and an upper control arm spring support plate secured to the upper control arm such that expansion of the air spring pushes against said lower control arm spring support plate and the upper control arm spring support plate, resulting in a lifting of the upper frame mounting structure relative to the upper control arm pivot point and a lifting of the lower frame mounting structure relative to the lower control arm pivot point.

12. The truck or trailer of claim 11, wherein a line between the upper frame mounting structure pivot point and the lower frame mounting structure pivot point is perpendicular to the direction of expansion and contraction of the air spring.

13. The truck or trailer of claim 12, further comprising an opposed wheel forming a wheel pair with the wheel, the suspension system further comprising:
an opposed upper mounting bracket extending from an opposed stub-axle spindle;
an opposed lower mounting bracket extending from the opposed stub-axle spindle,
an opposed upper control arm pivotally secured to the opposed upper mounting bracket to pivot about an opposed upper control arm pivot point;
an opposed lower control arm pivotally secured to the lower mounting bracket to pivot about a lower control arm pivot point, wherein the opposed upper control arm is pivotally secured to the upper frame mounting structure at an opposed upper frame mounting structure pivot point, and the opposed lower control arm is pivotally secured to the lower frame mounting structure at an opposed lower frame mounting structure pivot point.

14. A truck or trailer comprising:
a wheel;
a stub axle spindle extending through the wheel and having a through bore;
a step-up drive ratio unit inboard of said stub-axle spindle;
an axle shaft extending through the through bore of the stub-axle spindle and operatively connected to the step-up drive ratio unit, the axle shaft rotating with the wheel;

a power conversion unit operatively connected to the step-up drive ratio unit, such that mechanical energy from rotation of the axle shaft is converted, through the step-up drive ratio unit and the power conversion unit, into electrical energy; and a suspension system comprising:
an upper mounting bracket extending from the stub-axle spindle;
a lower mounting bracket extending from the stub-axle spindle, wherein the suspension system provides room for the axle shaft and step-up drive ratio unit;
an air spring having a direction of expansion and contraction, the air spring being mounted such that the direction of expansion and contraction is off of vertical;
an upper control arm pivotally secured to the upper mounting bracket to pivot about an upper control arm pivot point;
a lower control arm pivotally secured to the lower mounting bracket to pivot about a lower control arm pivot point;
an upper frame mounting structure mounting the suspension system to the truck or trailer, the upper control arm being pivotally secured to the upper frame mounting structure at an upper frame mounting structure pivot point; and
a lower frame mounting structure mounting the suspension system to the truck or trailer, the lower control arm being pivotally secured to the lower frame mounting structure at a lower frame mounting structure pivot point, the truck or trailer further comprising an opposed wheel forming a wheel pair with the wheel, the suspension system further comprising:
an opposed upper mounting bracket extending from an opposed stub-axle spindle;
an opposed lower mounting bracket extending from the opposed stub-axle spindle;
an opposed upper control arm pivotally secured to the opposed upper mounting bracket to pivot about an opposed upper control arm pivot point;
an opposed lower control arm pivotally secured to the lower mounting bracket to pivot about a lower control arm pivot point, wherein the opposed upper control arm is pivotally secured to the upper frame mounting structure at an opposed upper frame mounting structure pivot point, and the opposed lower control arm is pivotally secured to the lower frame mounting structure at an opposed lower frame mounting structure pivot point, wherein the air spring is an upper air spring, and the truck or trailer further comprises a lower air spring, and further wherein:
the upper air spring is mounted between an upper control arm spring support plate secured to the upper control arm and an opposed upper control arm spring support plate secured to the opposed upper control arm such that expansion of the upper air spring pushes against said upper control arm spring support plate and the opposed upper control arm spring support plate resulting in a lifting of the upper frame mounting structure, as the upper control arm pivots about the upper control arm pivot point and the opposed upper control arm pivots about the opposed upper control arm pivot point; and
the lower air spring is mounted between a lower control arm spring support plate secured to the lower control arm and an opposed lower control arm spring support plate secured to the opposed lower control arm such that expansion of the lower air, spring pushes against the lower control arm spring support plate and the opposed lower control arm spring support plate resulting in a lifting of the lower frame mounting structure, as the lower control arm pivots about the lower control arm pivot point and the opposed lower upper control arm pivots about the opposed lower control arm pivot point.

15. A truck or trailer comprising:

a wheel;

a stub axle spindle extending through the wheel; and a suspension system comprising:

an upper mounting bracket extending from the stub axle spindle;

a lower mounting bracket extending from the stub axle spindle; and an air spring having a direction of expansion and contraction, the air spring being mounted such that the direction of expansion and contraction is off of vertical;

an upper control arm pivotally secured to the upper mounting bracket to pivot about an upper control arm pivot point;

a lower control arm pivotally secured to the lower mounting bracket to pivot about a lower control arm pivot point;

an upper frame mounting structure mounting the suspension system to the truck or trailer, the upper control arm being pivotally secured to the upper frame mounting structure at an upper frame mounting structure pivot point;

a lower frame mounting structure mounting the suspension system to the truck or trailer, the lower control arm being pivotally secured to the lower frame mounting structure at a lower frame mounting structure pivot point, wherein a line between the upper control arm pivot point and the lower control arm pivot point is perpendicular to the direction of expansion and contraction of the air spring.

\* \* \* \* \*